United States Patent
Gross et al.

(10) Patent No.: US 12,415,594 B2
(45) Date of Patent: Sep. 16, 2025

(54) CERAMIC KELVIN FOAM WITH GEOMETRY OPTIMIZED FOR HYDROSTATIC LOADING

(71) Applicant: University of South Carolina, Columbia, SC (US)

(72) Inventors: Andrew Gross, Columbia, SC (US); Fakhreddin Emami, Cayce, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 18/512,248

(22) Filed: Nov. 17, 2023

(65) Prior Publication Data
US 2024/0239472 A1    Jul. 18, 2024

Related U.S. Application Data

(60) Provisional application No. 63/480,337, filed on Jan. 18, 2023.

(51) Int. Cl.
| | |
|---|---|
| *B64B 1/08* | (2006.01) |
| *C04B 35/565* | (2006.01) |
| *C04B 38/00* | (2006.01) |
| *C04B 111/00* | (2006.01) |

(52) U.S. Cl.
CPC ............ *B64B 1/08* (2013.01); *C04B 38/0051* (2013.01); *C04B 35/565* (2013.01); *C04B 2111/00982* (2013.01)

(58) Field of Classification Search
CPC .... B64B 1/08; B64B 1/06; B64B 1/60; B64G 1/16
See application file for complete search history.

(56) References Cited

U.S. PATENT DOCUMENTS

| | | | |
|---|---|---|---|
| 4,113,206 A * | 9/1978 | Wheeler | B64B 1/08 52/63 |
| 2017/0096208 A1* | 4/2017 | Klagenberg | B64B 1/62 |
| 2021/0122453 A1* | 4/2021 | Amezquita Zatarain | B64F 5/10 |
| 2023/0141407 A1* | 5/2023 | Van Egmond | E04B 1/3211 244/119 |
| 2024/0017811 A1* | 1/2024 | Toli | B64B 1/14 |

* cited by examiner

*Primary Examiner* — Joshua J Michener
*Assistant Examiner* — Ashesh Dangol
(74) *Attorney, Agent, or Firm* — Offit Kurman; Douglas L. Lineberry

(57) ABSTRACT

Described herein are cellular materials comprised of a 3D periodic network of beams with open-cell Kelvin foam (truncated octahedron) that have particular cross-sectional geometries that resist buckling while also suppressing failure of the base material when the cellular material is subjected to hydrostatic loading.

16 Claims, 33 Drawing Sheets

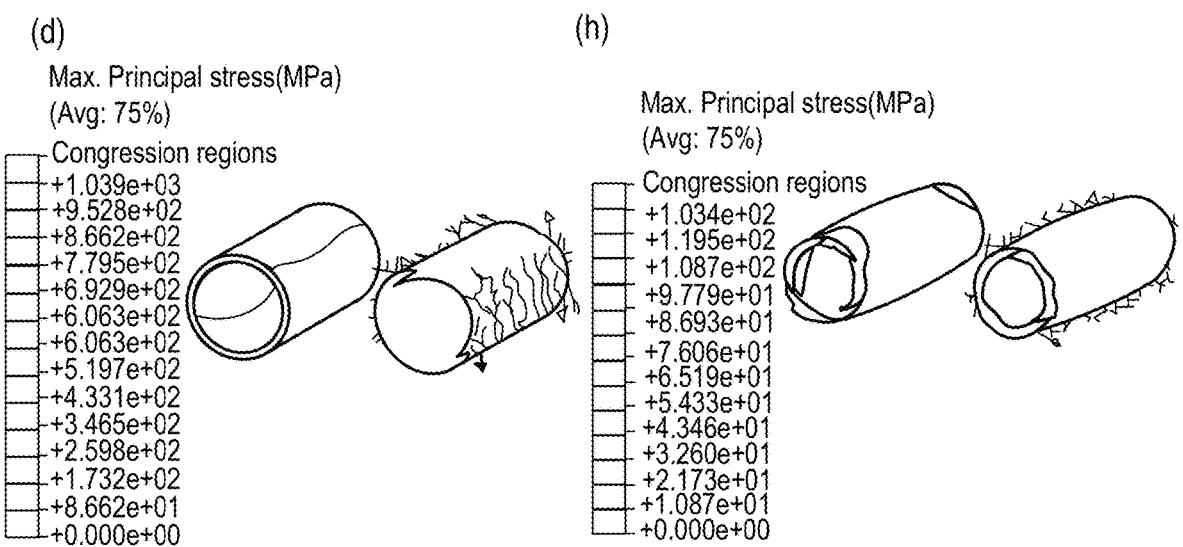
FIG. 21 (Con't)

Table 1

FS for baseline cases. Limiting FS shown in bold font. Uniform geometry is defined by the strut slenderness ration $\lambda = \frac{L}{d}$ and strut wall thickness $\beta = \frac{d}{t}$.

| Baseline case | Buckling FS | Shear FS | Tensile FS | Strut slenderness ratio | Strut wall thickness |
|---|---|---|---|---|---|
| Hollow $\bar{p}$ = 2.00% | 5.07 | 1.53 | 0.34 | 3.22 | 12.72 |
| Hollow $\bar{p}$ = 1.50% | 3.67 | 1.11 | 0.19 | 3.52 | 14.67 |
| Hollow $\bar{p}$ = 1.00% | 2.66 | 0.65 | 0.09 | 3.94 | 17.91 |
| Hollow $\bar{p}$ = 0.65% | 1.11 | 0.35 | 0.05 | 4.47 | 22.10 |
| Solid $\bar{p}$ = 2.00% | 1.01 | 2.25 | 5.97 | 6.38 | - |
| Solid $\bar{p}$ = 1.50% | 1.00 | 1.78 | 0.00 | 7.23 | - |
| Solid $\bar{p}$ = 1.00% | 0.42 | 1.30 | 4.41 | 9.05 | - |
| Solid $\bar{p}$ = 0.65% | 0.22 | 1.20 | 3.97 | 11.25 | - |

FIG. 28

Table 2
FS for optimized models

| Optimized model | Buckling FS | Shear FS | Tensile FS | Improvement (%) |
|---|---|---|---|---|
| Hollow ρ = 2.00% | 2.80 | 2.30 | 2.30 | 27 |
| Hollow ρ = 1.50% | 1.94 | 1.94 | 1.94 | 92 |
| Hollow ρ = 1.00% | 1.53 | 1.51 | 1.51 | 260 |
| Hollow ρ = 0.65% | 1.13 | 1.13 | 1.13 | 528 |
| Solid ρ = 2.00% | 1.90 | 1.98 | 9.13 | 5 |
| Solid ρ = 1.50% | 1.07 | 1.81 | 9.01 | 6 |
| Solid ρ = 1.25% | 0.74 | 1.61 | 3.53 | 76 |

FIG. 29

Table 3
Thermal conductivity of the optimized models

| Optimized model | $K_{cond}\left(\frac{W}{m \cdot K}\right)$ - FEM | $K_{cond}\left(\frac{W}{m \cdot K}\right)$ - Eq. 17 |
|---|---|---|
| Hollow $\bar{\rho} = 2.00\%$ | 0.44 | 0.39 |
| Hollow $\bar{\rho} = 1.50\%$ | 0.33 | 0.29 |
| Hollow $\bar{\rho} = 1.00\%$ | 0.22 | 0.19 |
| Hollow $\bar{\rho} = 0.65\%$ | 0.14 | 0.13 |
| Solid $\bar{\rho} = 2.00\%$ | 0.44 | 0.39 |

*FIG. 30*

Table A1
Optimized design variables (correspond to Ā) and fillet radius

| Optimized model | $w_1$ | $w_2$ | $w_3$ | $w_4$ | $w_5$ | $w_6$ | $w_7$ | EFR | IFR |
|---|---|---|---|---|---|---|---|---|---|
| Hollow - $\bar{\rho}$ = 2.00% | 0.216 | -0.106 | -0.556 | 0.305 | -0.626 | 0.155 | 0.823 | 13.218 | 14.708 |
| Hollow - $\bar{\rho}$ = 1.50% | 0.169 | -0.039 | -0.448 | 0.153 | -0.193 | -0.372 | 0.971 | 11.611 | 12.551 |
| Hollow - $\bar{\rho}$ = 1.00% | 0.115 | -0.193 | -0.542 | 0.265 | -0.676 | 0.255 | 0.949 | 7.434 | 12.722 |
| Hollow - $\bar{\rho}$ = 0.65% | 0.059 | 0.013 | -0.192 | 0.055 | -0.084 | -0.376 | 0.955 | 6.352 | 9.785 |
| Solid - $\bar{\rho}$ = 2.00% | 0.233 | -0.069 | -0.075 | -0.006 | -0.033 | 0.106 | 0.017 | 8.360 | — |
| Solid - $\bar{\rho}$ = 1.50% | 0.168 | -0.103 | 0.168 | 0.136 | -0.505 | 0.759 | -0.462 | 9.850 | — |
| Solid - $\bar{\rho}$ = 1.25% | 0.134 | 0.110 | 0.286 | -0.019 | -0.137 | 0.462 | -0.716 | 10.457 | — |

FIG. 31

Table A2
Optimized design variables (correspond to $\bar{R}$)

| Optimized model | $w_8$ | $w_9$ | $w_{10}$ | $w_{11}$ | $w_{12}$ | $w_{13}$ | $w_{14}$ |
|---|---|---|---|---|---|---|---|
| Hollow - $\bar{\rho}$ = 2.00% | 0.108 | 0.077 | -0.099 | -0.097 | -0.009 | -0.043 | 0.393 |
| Hollow - $\bar{\rho}$ = 1.50% | 0.108 | 0.077 | -0.099 | -0.097 | -0.009 | -0.043 | 0.393 |
| Hollow - $\bar{\rho}$ = 1.00% | 0.347 | -0.198 | -0.010 | -0.209 | 0.565 | -0.632 | 0.401 |
| Hollow - $\bar{\rho}$ = 0.65% | 0.465 | -0.321 | -0.373 | -0.107 | 0.560 | -0.914 | 0.875 |
| Solid - $\bar{\rho}$ = 2.00% | — | — | — | — | — | — | — |
| Solid - $\bar{\rho}$ = 1.50% | — | — | — | — | — | — | — |
| Solid - $\bar{\rho}$ = 1.25% | — | — | — | — | — | — | — |

FIG. 32

CERAMIC KELVIN FOAM WITH GEOMETRY OPTIMIZED FOR HYDROSTATIC LOADING

This invention was made with Government support under contract 80NSSC21M0154 awarded by NASA. The Government has certain rights in this invention.

TECHNICAL FIELD

The subject matter disclosed herein is generally directed to cellular materials, and methods for making same, comprised of a 3D periodic network of beams with open-cell Kelvin foam (truncated octahedron) that have particular cross-sectional geometries that resist buckling while also suppressing failure of the base material when the cellular material is subjected to hydrostatic loading as shown and described herewith.

SUMMARY

The above objectives are accomplished according to the present disclosure by providing in one instance a vehicle able to function in extreme temperature, corrosive chemical composition, and high atmospheric pressure. The vehicle may include an exterior and an interior, at least one low-density ceramic truss strut and at least one low-density ceramic node in the interior of the vehicle forming at least one lattice, at least one first chamber in the interior of the vehicle configured to contain a vacuum, at least one lifting gas contained within the interior of the vehicle, at least one central cold bay chamber in substantially a center of the interior of the vehicle with the at least one lattice located outside a central cold bay exterior of the at least one central cold bay and at least one low emissivity coating applied on the exterior of the vessel. Further, 1, wherein, the vehicle is a vacuum airship. Still yet, the vehicle may contain a second chamber located within and adjacent to the exterior of the vehicle configured to substantially fill with an atmospheric gas, wherein the atmospheric gas performs as ballast for the vehicle. Yet again, the at least one lattice may remain mechanically stable when deployed in environmental conditions comprising substantially: atmospheric density $\rho=65$ kg/m$^3$, atmospheric pressure p=9.2 MPa, and surface temperature T=464° C. Moreover, the at least one low-density ceramic truss-lattice may comprise a SiC Kelvin foam. Still yet, the SiC Kelvin foam may comprise at least one tetrakaidecahedron cell. Again still, there may be at least one fluid filled chamber in the interior of the vehicle. Further yet again, the vehicle may include at least one instrument contained within the at least one central cold bay. Still further, the at least one lattice may be asymmetric. Furthermore, the at least one lattice may have a strength scaling relationship shown by $$\bar{\sigma}_f^{BAM}(GPa)=0.134\cdot 1.85\cdot \bar{\rho}^{-0.62} \quad (15)$$

wherein $\bar{\rho}$ is relative density; and wherein $\bar{\sigma}_f^{BAM}$ is pressure sensitive strength. Still yet, the vehicle may be configured to have a relative density of substantially $\bar{\rho}=0.65\%$ and may generate 44 kg of lift for every cubic meter of atmosphere that it displaces. Moreover yet, the vehicle may be configured to collocate shear stress concentrations in at least one nodal region undergoing high pressure stress. Still yet again, the at least one low-density ceramic truss strut may be hollow with a relative density of substantially $\bar{\rho}=1.5\%$ or $\bar{\rho}=2\%$. Again still, the at least one low emissivity coating may include Au. Still yet further, the thermal conductivity of the vehicle may be approximated by $$K_{cond} = \frac{\bar{\rho}}{3}\cdot K, \quad (17)$$

wherein K is the thermal conductivity of a parent material forming the at least one ceramic truss strut and the at least one ceramic node, $K_{cond}$ is thermal conductivity; $\bar{\rho}$ and is relative density. Further still again, the lifting gas may be He.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which.

(a) evolution of key performance measures; (b) Evolution of the design variables; (c) evolution of strut cross-sectional geometry; (d) FS and bulk modulus from the highest performing candidate designs at different relative densities; and (e) strut profiles for the models with highest FS at 0.8%, 1.0%, 1.25%, and 1.5% relative densities.

Figure 10:
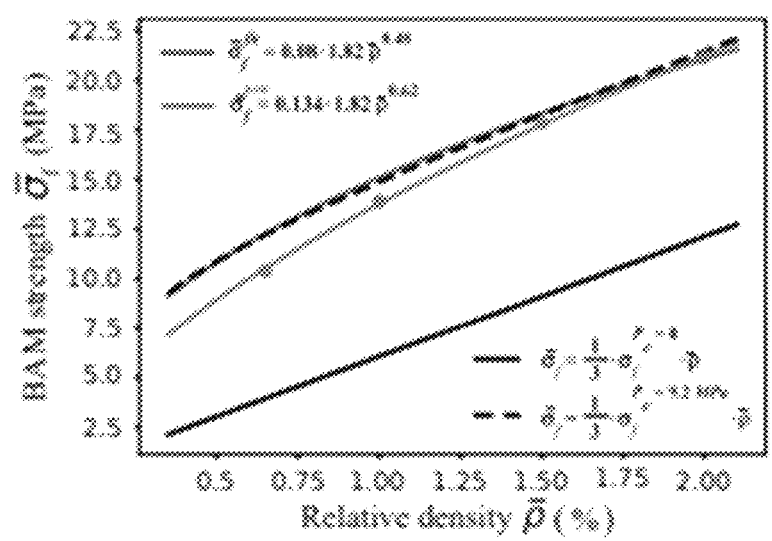

FIG. 10 shows SiC BAMs strength scaling relation and its comparison with scaling relation limits for stretching dominated truss lattice material.

Figure 11:
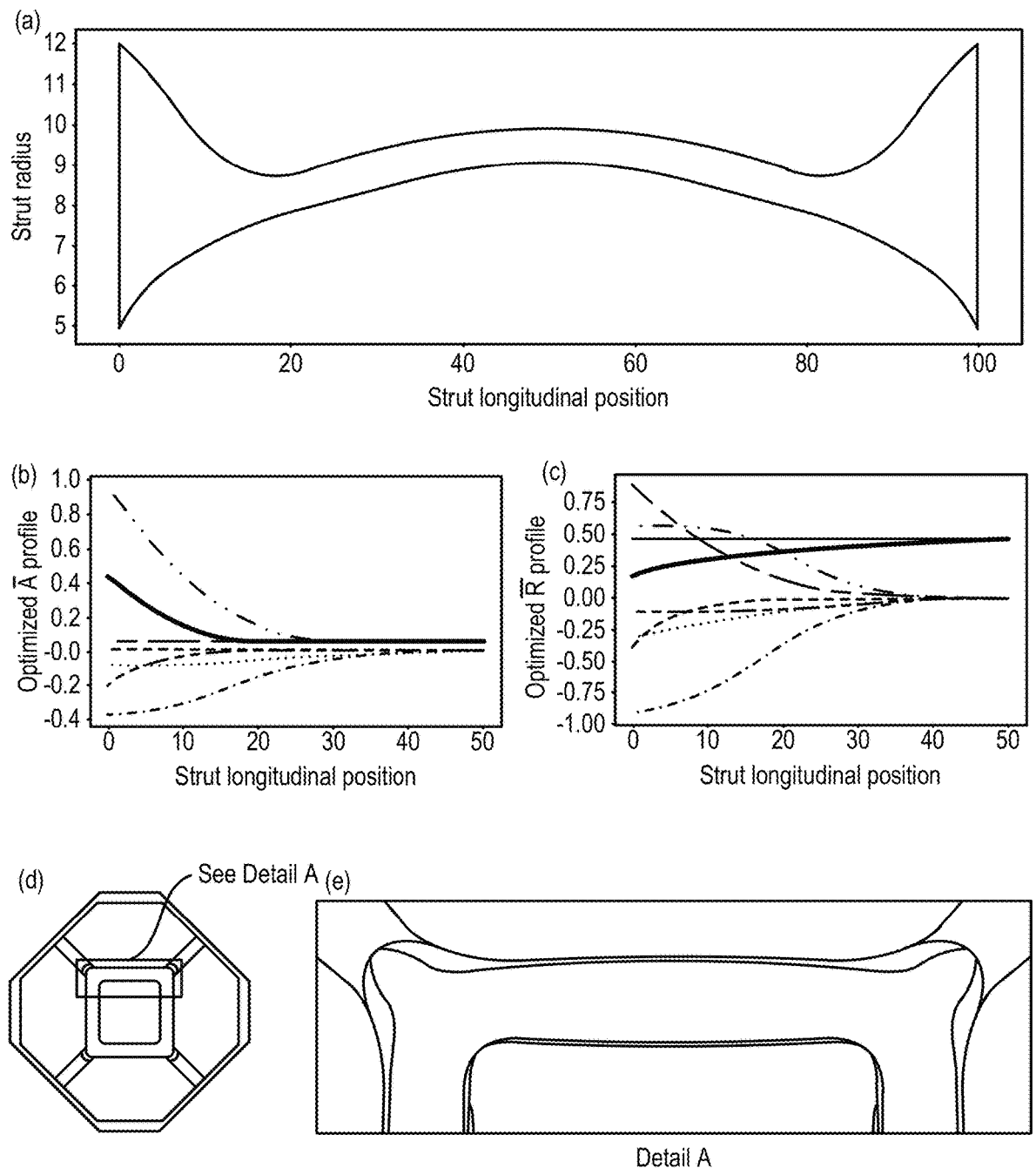

FIG. 11 shows Geometric details of the $\bar{\rho}=0.65\%$ optimized unit cell geometry with hollow struts obtained by minimizing $$-\frac{1}{FS}:$$

(a) profile of the revolved section used to generate the struts; (b) Optimal normalized cross-sectional area $\bar{A}$ along the length of the struts; (c) optimal normalized radius $\bar{r}$ along the length of the struts; (d) Kelvin unit cell with optimized geometry; and (e) Cross-sectional view highlighting a single strut and nodal geometry.

Figure 12:
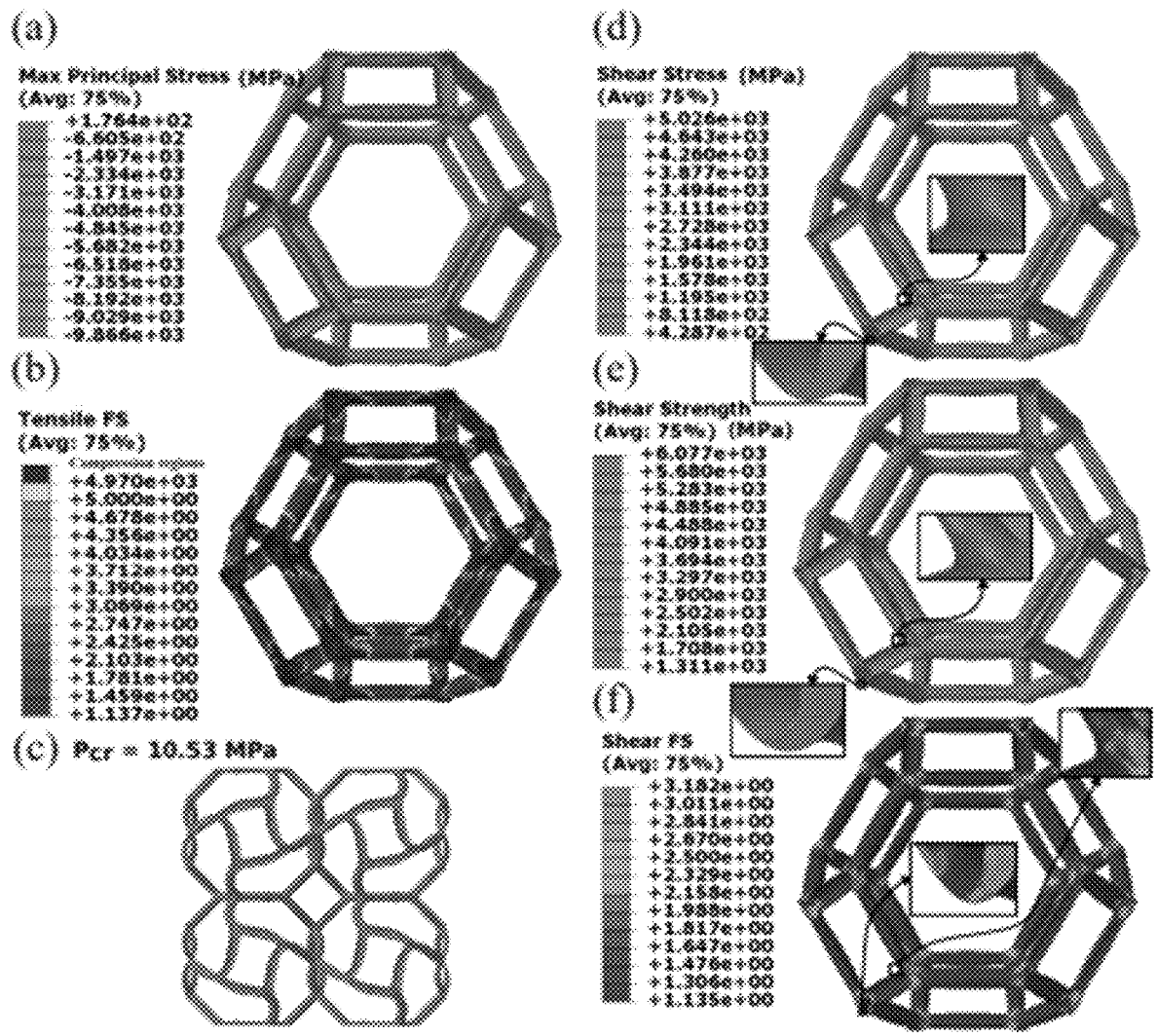

FIG. 12 shows stress analysis results for the optimized geometry with $\bar{\rho}=0.65\%$ relative density when loaded by the atmospheric pressure at the surface of Venus; (a) maximum principal stress field; (b) tensile FS field. FS on the free surfaces are computed from the membrane elements; (c) critical eigen mode from buckling analysis of the 2×2×2 tessellation of the optimized geometry; (d) shear stress field; (e) Shear strength determined from the local pressure stress fields and EMC model; and (f) Shear FS field.

Figure 13:
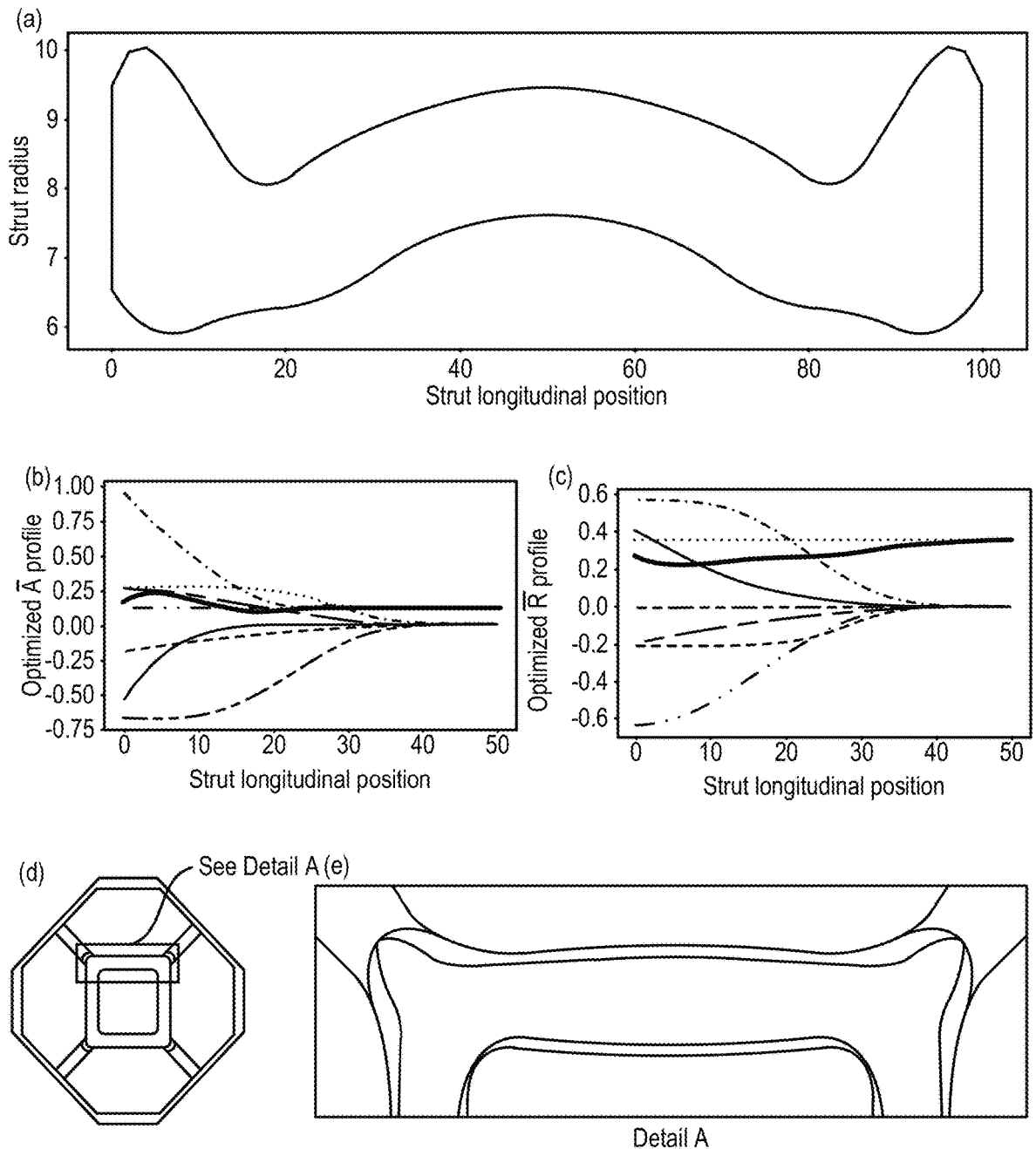

FIG. 13 shows geometric details of the $\bar{\rho}=1.00\%$ optimized unit cell geometry with hollow struts obtained by minimizing $$\frac{1}{FS}:$$

(a) Profile of the revolved section used to generate the struts; (b) optimal normalized cross-sectional area $\bar{A}$ along the length of the struts; (c) optimal normalized radius $\bar{r}$ along the length of the struts; (d) Kelvin unit cell with optimized geometry; and (e) Cross-sectional view highlighting a single strut and nodal geometry.

Figure 14:
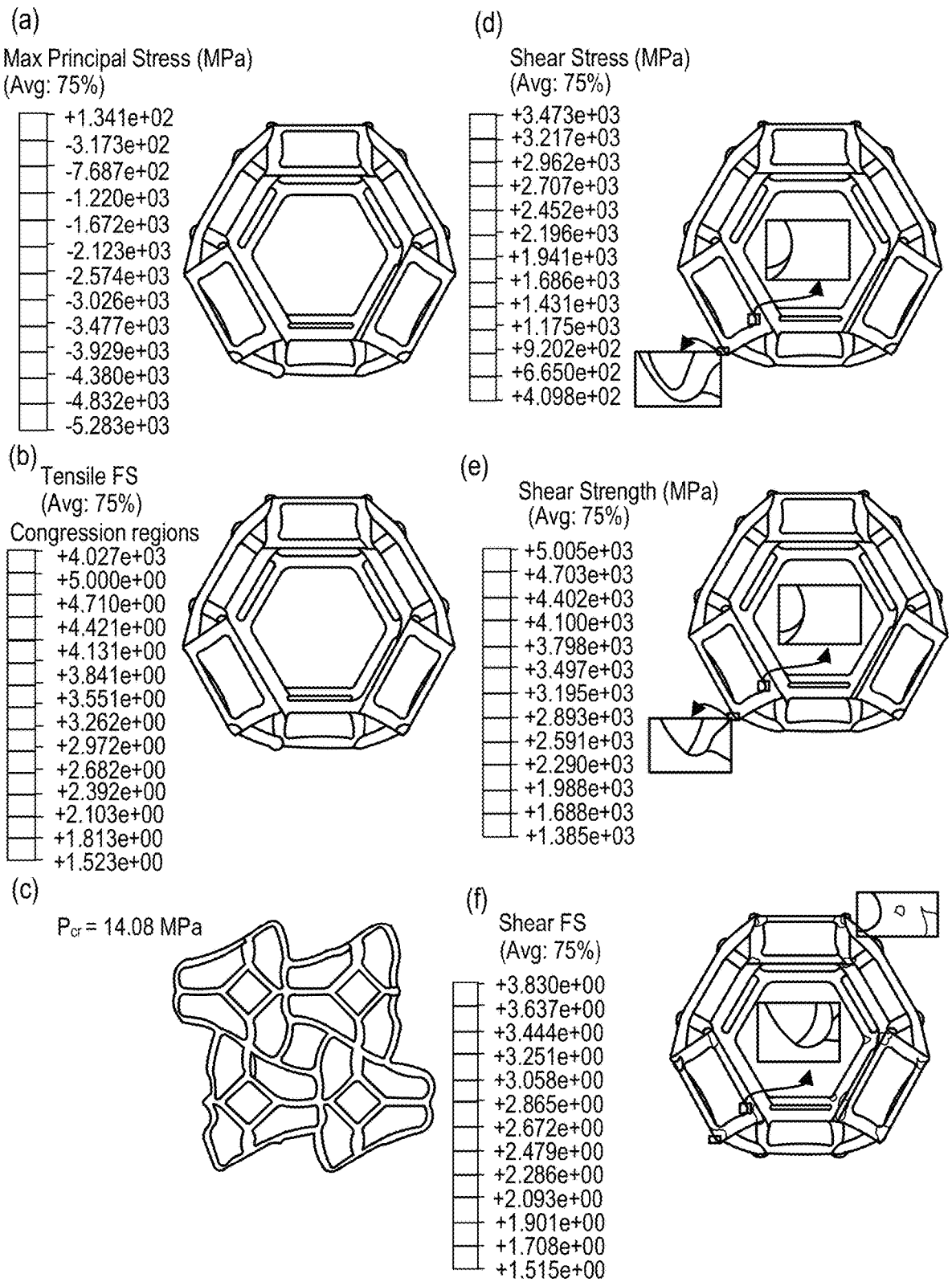

FIG. 14 shows stress analysis results for the optimized geometry with $\bar{\rho}=1.00\%$ relative density: (a) maximum principal stress field; (b) tensile FS field; (c) critical eigen mode from buckling analysis of the 2×2×2 tessellation of the optimized geometry; (d) shear stress field; (e) shear strength determined from the local pressure stress fields and EMC model; and (f) shear FS field.

Figure 15:
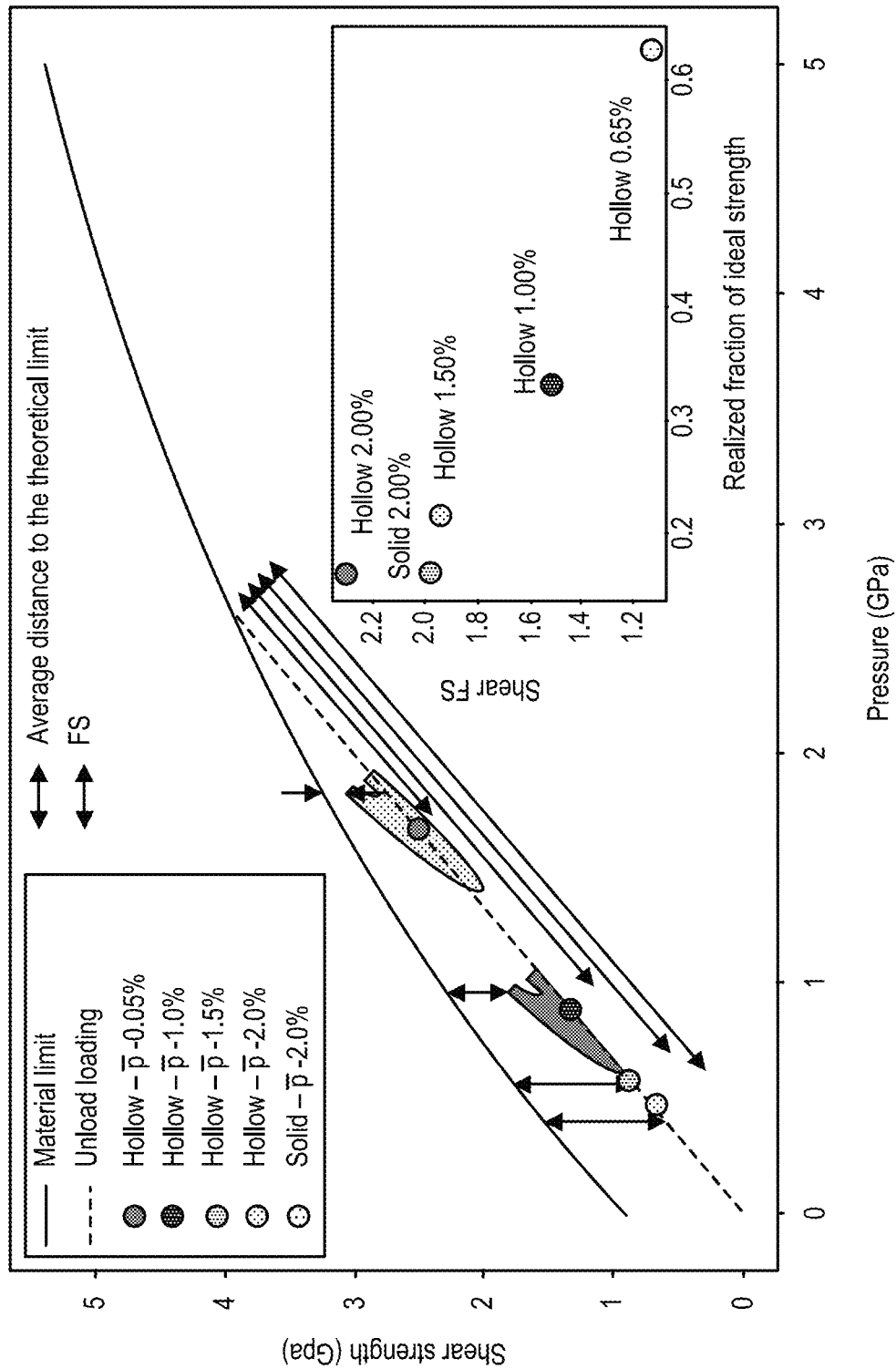

FIG. 15 shows the efficiency of optimized designs in utilizing the capacity of parent material is shown, where lower relative densities approach the theoretical limit of the material but have decreased FS.

Figure 16:
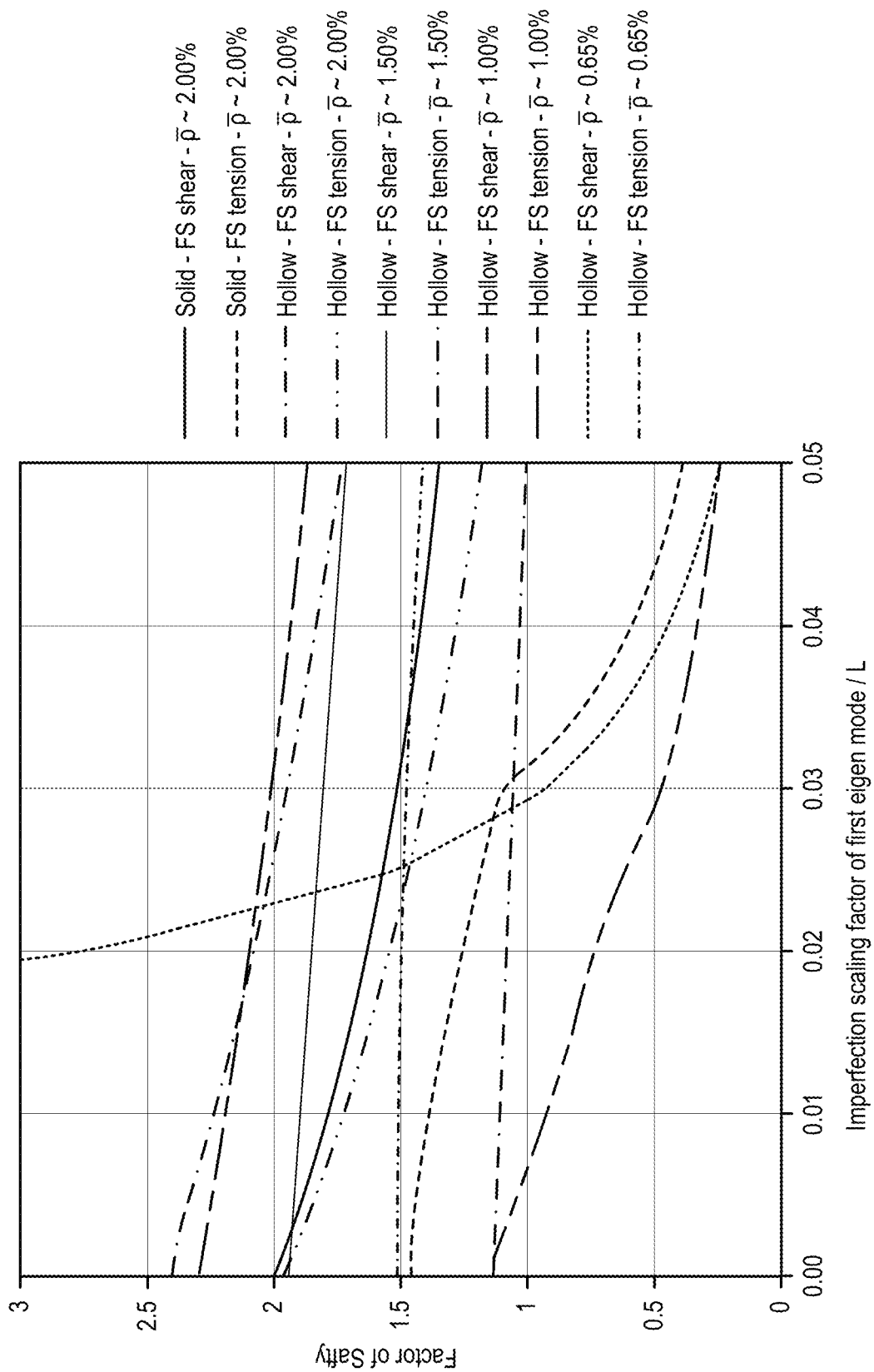

FIG. 16 shows sensitivity analysis of the optimized models due to geometrical imperfections, correspond to the first buckling eigen mode.

Figure 17:
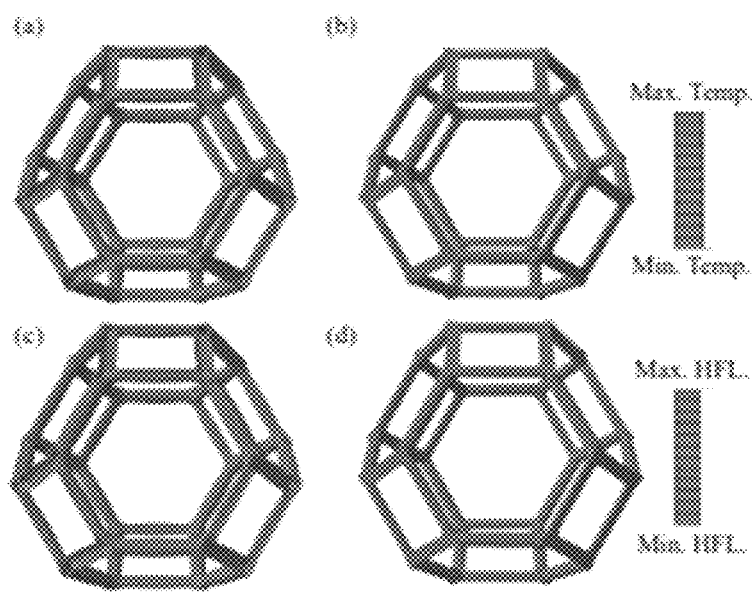

FIG. 17 shows nodal temperature and heat flux (HFL) of the optimized model under temperature gradient: (a) optimized hollow model with relative density $\bar{\rho}=0.65\%$ under equal temperature gradient in all periodicity directions; (b) optimized solid model with relative density $\bar{\rho}=2.0\%$ under temperature gradient in one periodicity directions; (c) corresponding (HFL) for the hollow model under the applied temperature gradients; and (d) corresponding (HFL) for the solid model under the applied temperature gradient.

Figure 18:
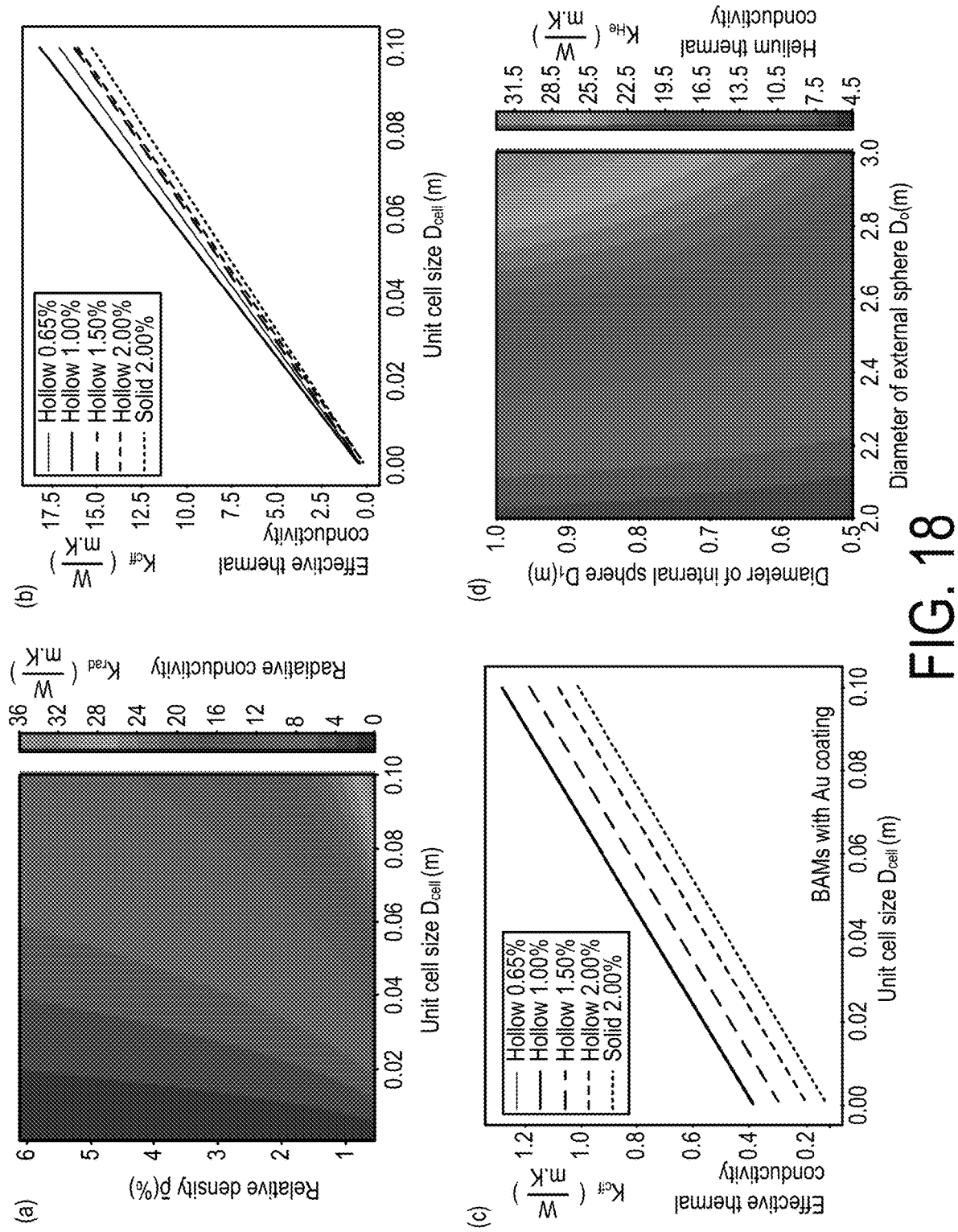

FIG. 18 shows at: (a) radiative thermal conductivity $K_{rad}$ of SiC Kelvin lattice for different relative densities $\bar{\rho}$ and unit cell sizes. (b) effective thermal conductivity $K_{eff}$ of the optimized BAM designs including heat conduction and radiation effect as a function of unit cell size $D_{cell}$; (c) effective thermal conductivity $K_{eff}$ of the optimized BAM designs with Au coating including heat conduction and radiation effect as a function of unit cell size $D_{cell}$. (d) Thermal conductivity of Helium $K_{He}$, under Venusian atmospheric conditions, as a function of diameters of concentric spheres—$D_o$ and $D_i$ denote the diameter of the external and internal spheres, respectively.

Figure 19:
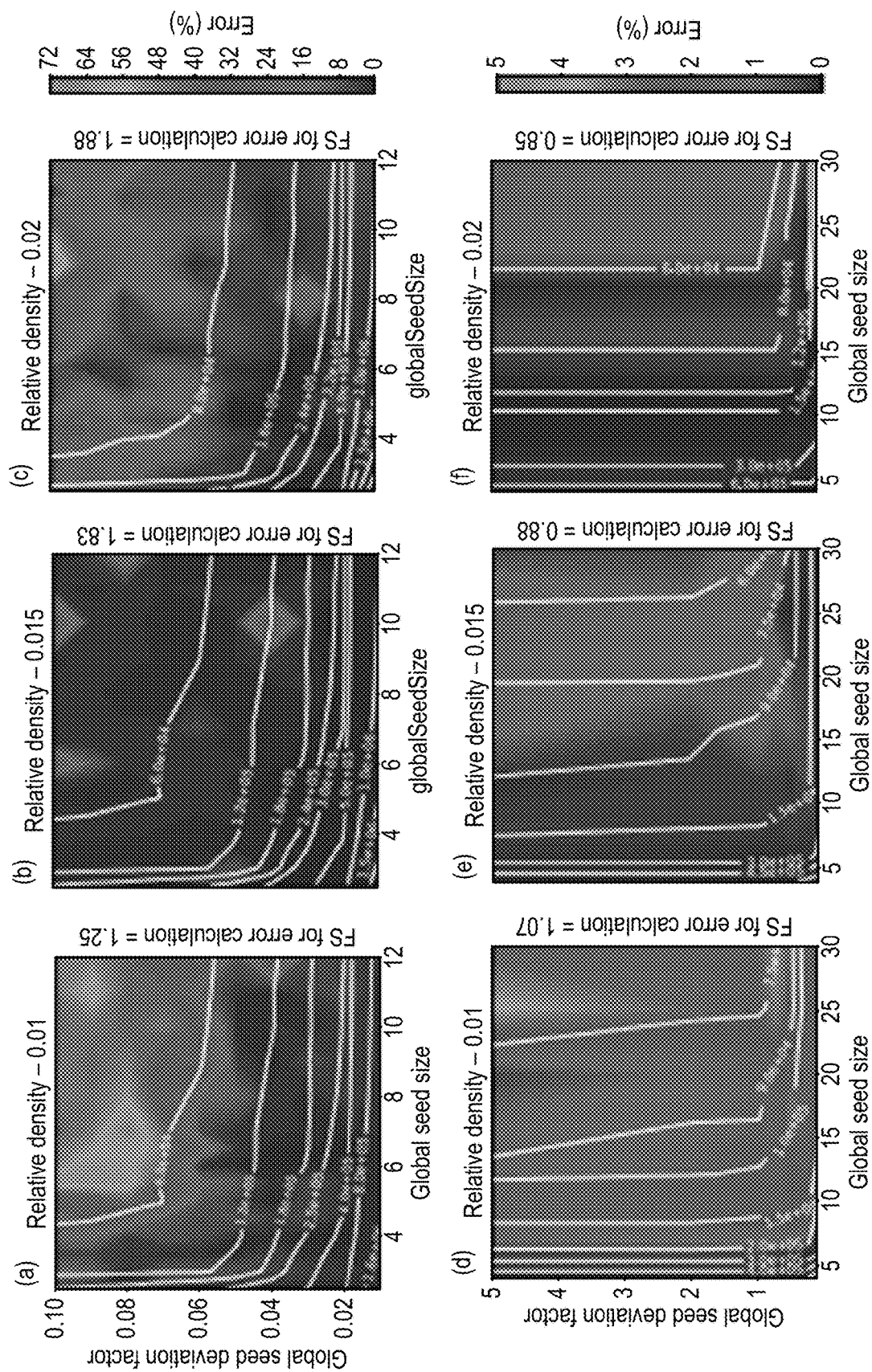

FIG. 19 shows mesh convergence results for single unit cell under hydrostatic pressure for cases with arbitrary geometry and relative densities: (a)$\bar{\rho}=1.00\%$; (b)$\bar{\rho}=1.50\%$; and (c)$\bar{\rho}=2.00\%$ and mesh convergence results for eigenvalue analysis of a 2×2×2 tessellation with arbitrary geometry and relative densities: (d)$\bar{\rho}=1.00\%$; (e)$\bar{\rho}=1.50\%$; and (f)$\bar{\rho}=2.00\%$.

Figure 20:
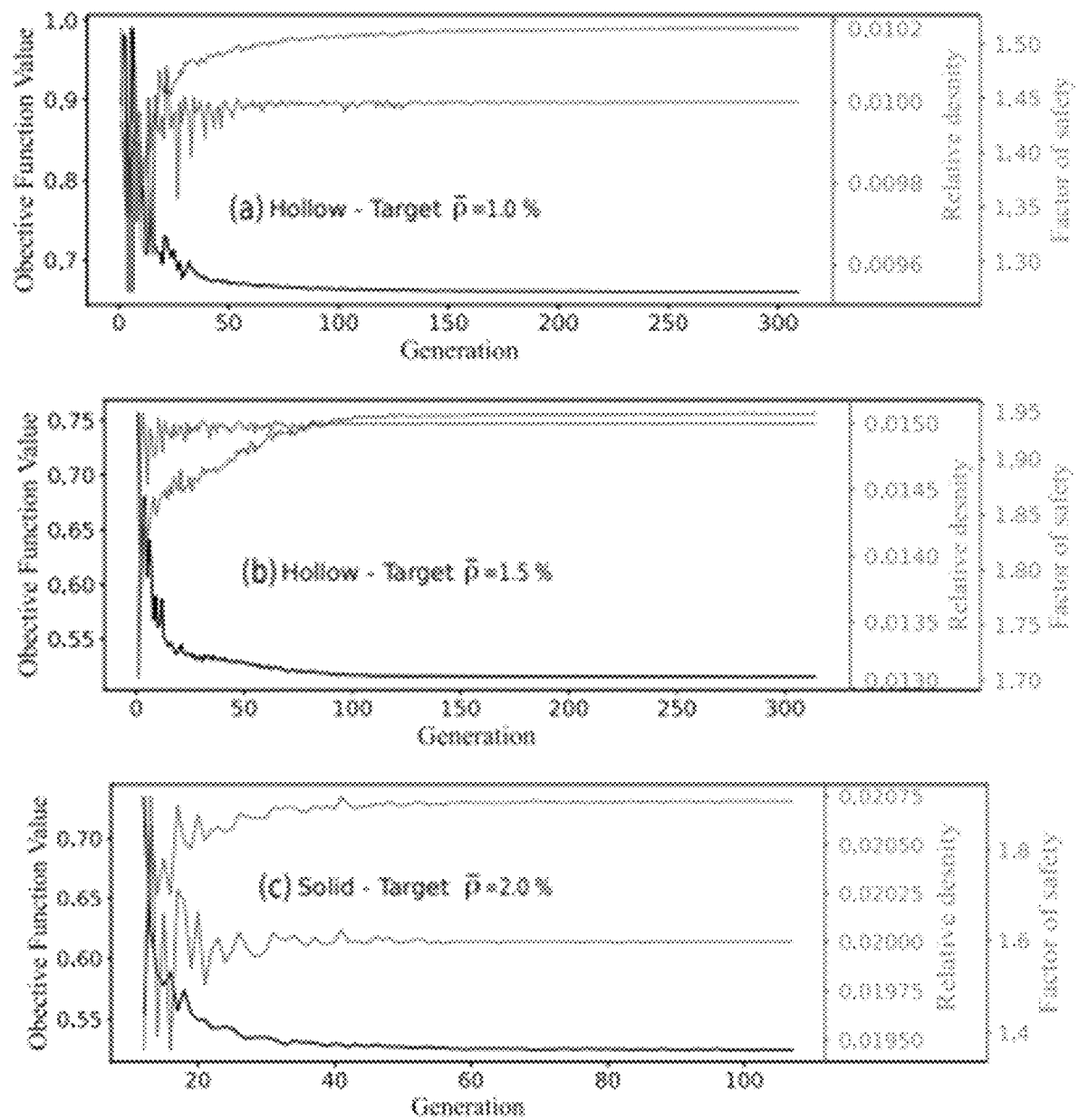

FIG. 20 shows optimization results at: (a) hollow strut unit cell with $\bar{\rho}=1.0\%$ target relative density; (b) hollow strut unit cell with $\bar{\rho}=1.5\%$ target relative density; (c) solid strut unit cell with $\bar{\rho}=2.0\%$ target relative density.

Figure 21:
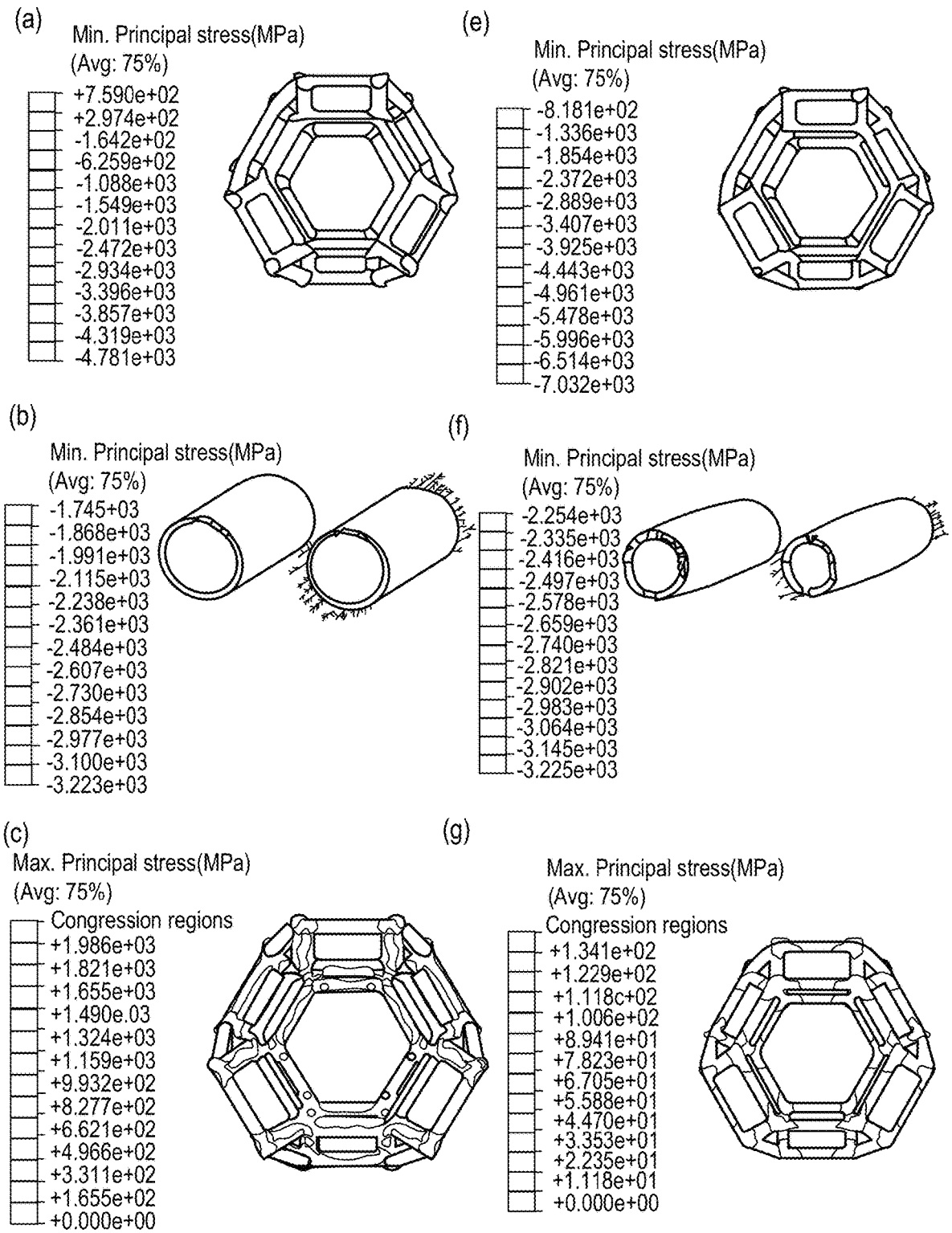

FIG. 21 shows comparison of the stress analysis results for the optimized geometry and its counterpart hollow base case for relative density $\bar{\rho}=1.0\%$: (a) minimum principal stress field for the base case; (b) minimum principal stress distribution and direction within a strut span for the base case; (c) maximum principal stress field for the base case; (d) maximum principal stress distribution and direction within a strut span for the base case; (e) minimum principal stress field for the optimized geometry; (f) minimum principal stress distribution and direction within a strut span for the optimized geometry; (g) maximum principal stress field for the optimized geometry; and (h) maximum principal stress distribution and direction within a strut span for the optimized geometry.

Figure 22:
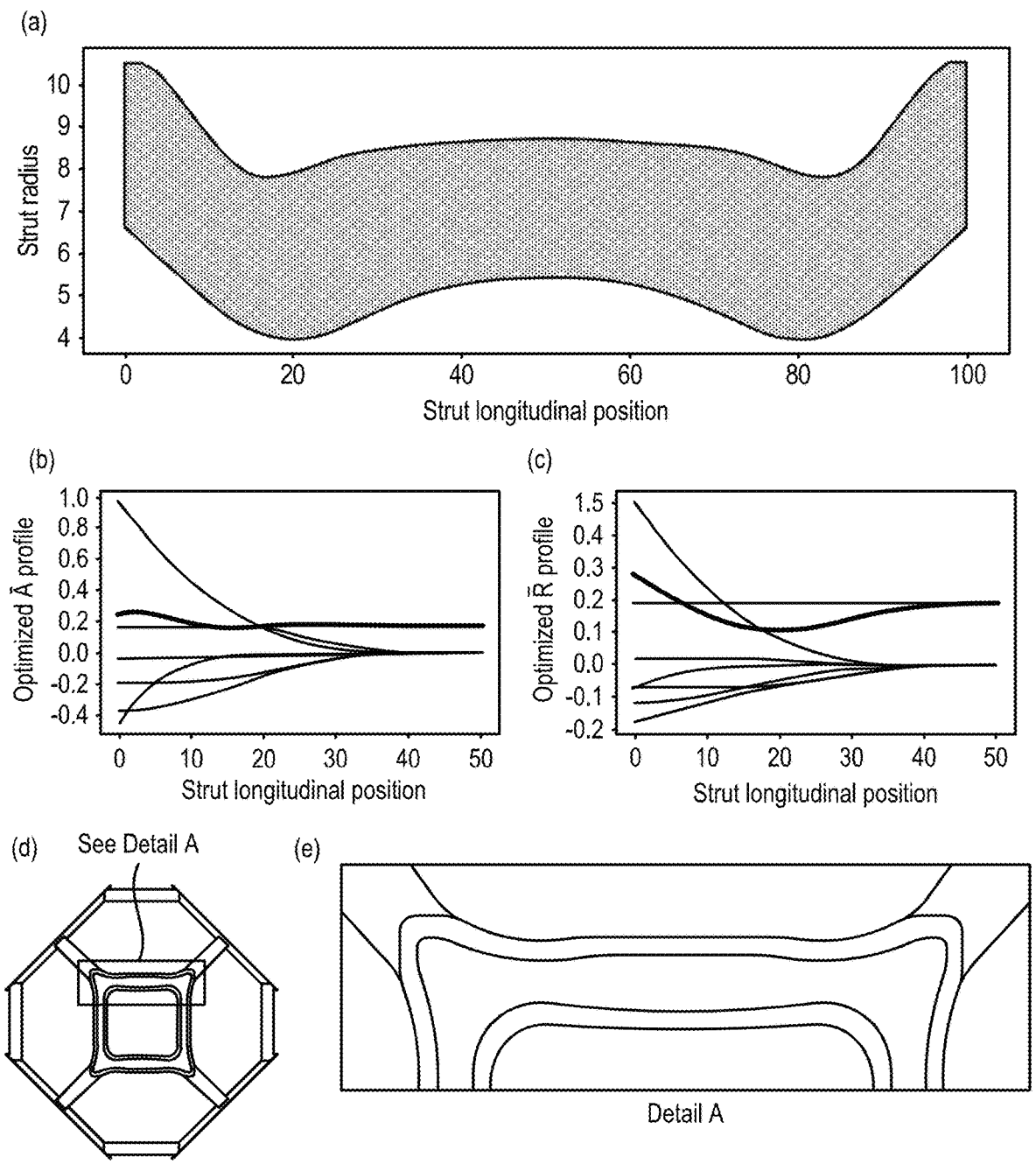

FIG. 22 shows geometric details of the $\bar{\rho}=1.50\%$ optimized unit cell geometry with hollow struts obtained by minimizing $$\frac{1}{FS}:$$

(a) profile of the revolved section used to generate the struts; (b) optimal normalized cross-sectional area $\bar{A}$ along the length of the struts; (c) optimal normalized radius $\bar{r}$ along the length of the struts; (d) Kelvin unit cell with optimized geometry; and (e) cross-sectional view highlighting a single strut and nodal geometry.

Figure 23:
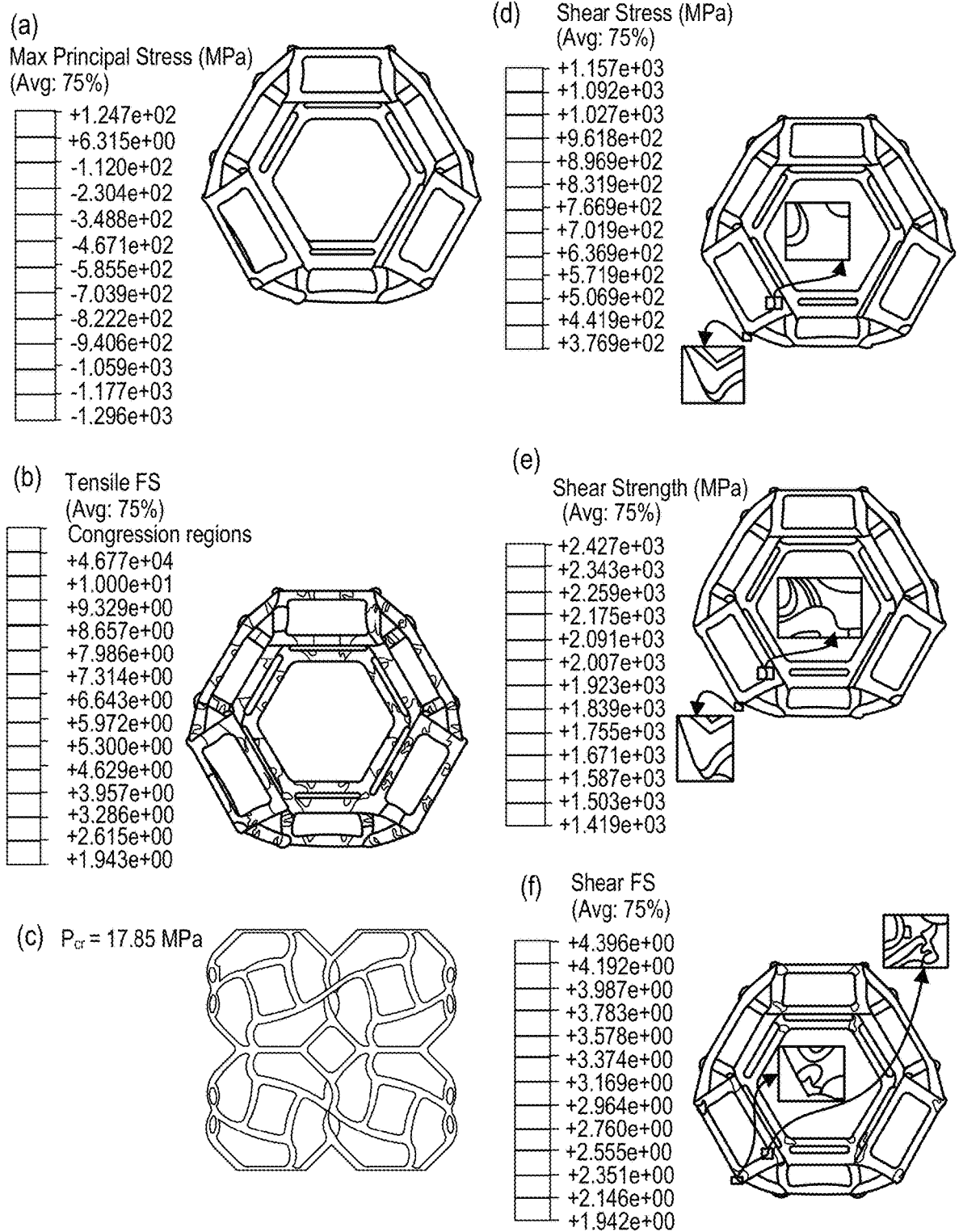

FIG. 23 shows stress analysis results for the optimized geometry with $\bar{\rho}=1.50\%$ relative density: (a) maximum principal stress field; (b) tensile FS field; (c) critical eigen mode from buckling analysis of the 2×2×2 tessellation of the optimized geometry; (d) shear stress field; and (e) shear strength determined from the local pressure stress fields and EMC model; and (f) shear FS field.

Figure 24:
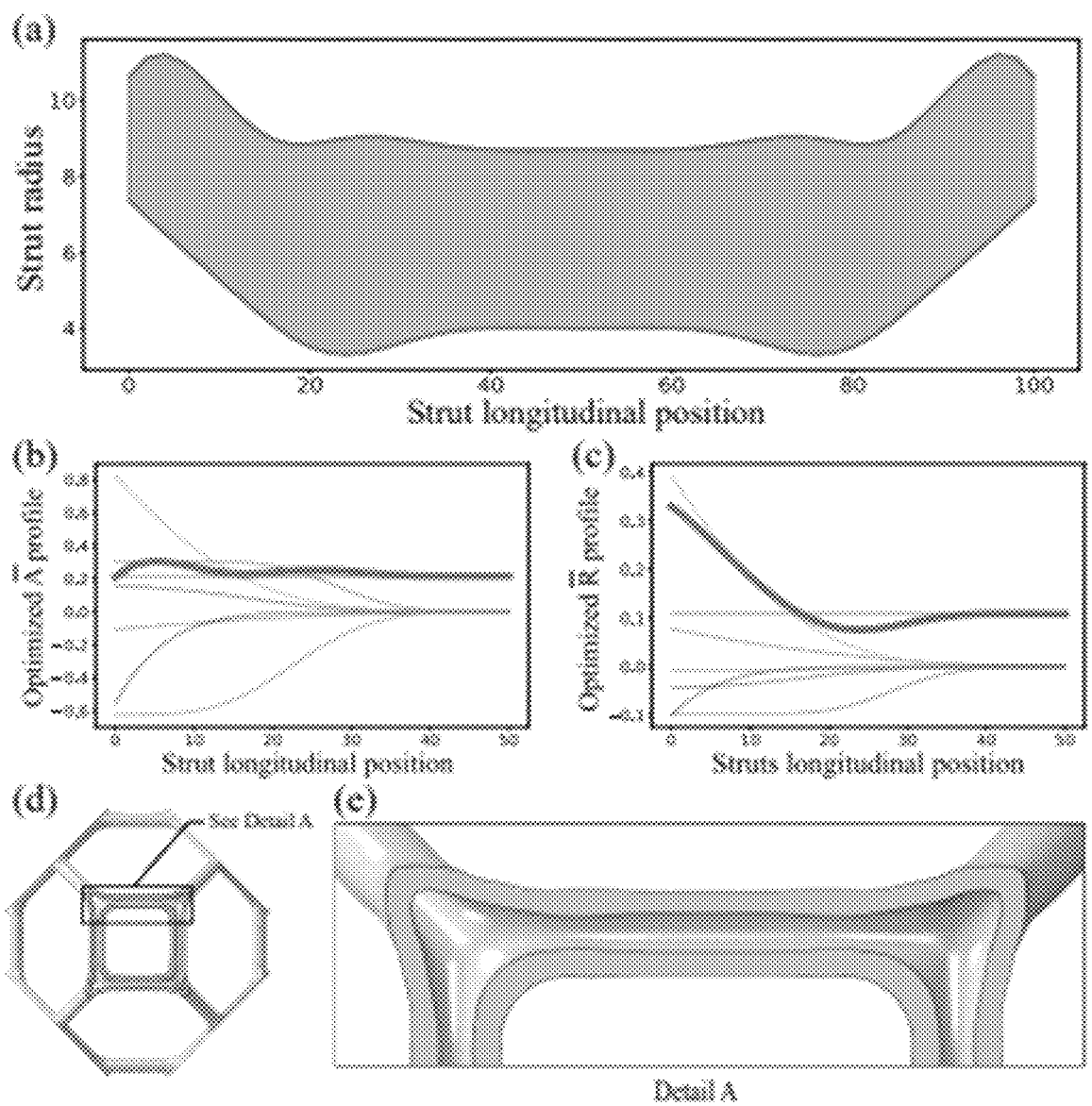

FIG. 24 shows geometric details of the $\bar{\rho}=2.00\%$ optimized unit cell geometry with hollow struts obtained by minimizing $$\frac{1}{FS}:$$

(a) profile of the revolved section used to generate the struts; (b) optimal normalized cross-sectional area $A^-$ along the length of the struts; (c) optimal normalized radius $\bar{r}$ along the length of the struts; (d) Kelvin unit cell with optimized geometry; and (e) cross-sectional view highlighting a single strut and nodal geometry.

Figure 25:
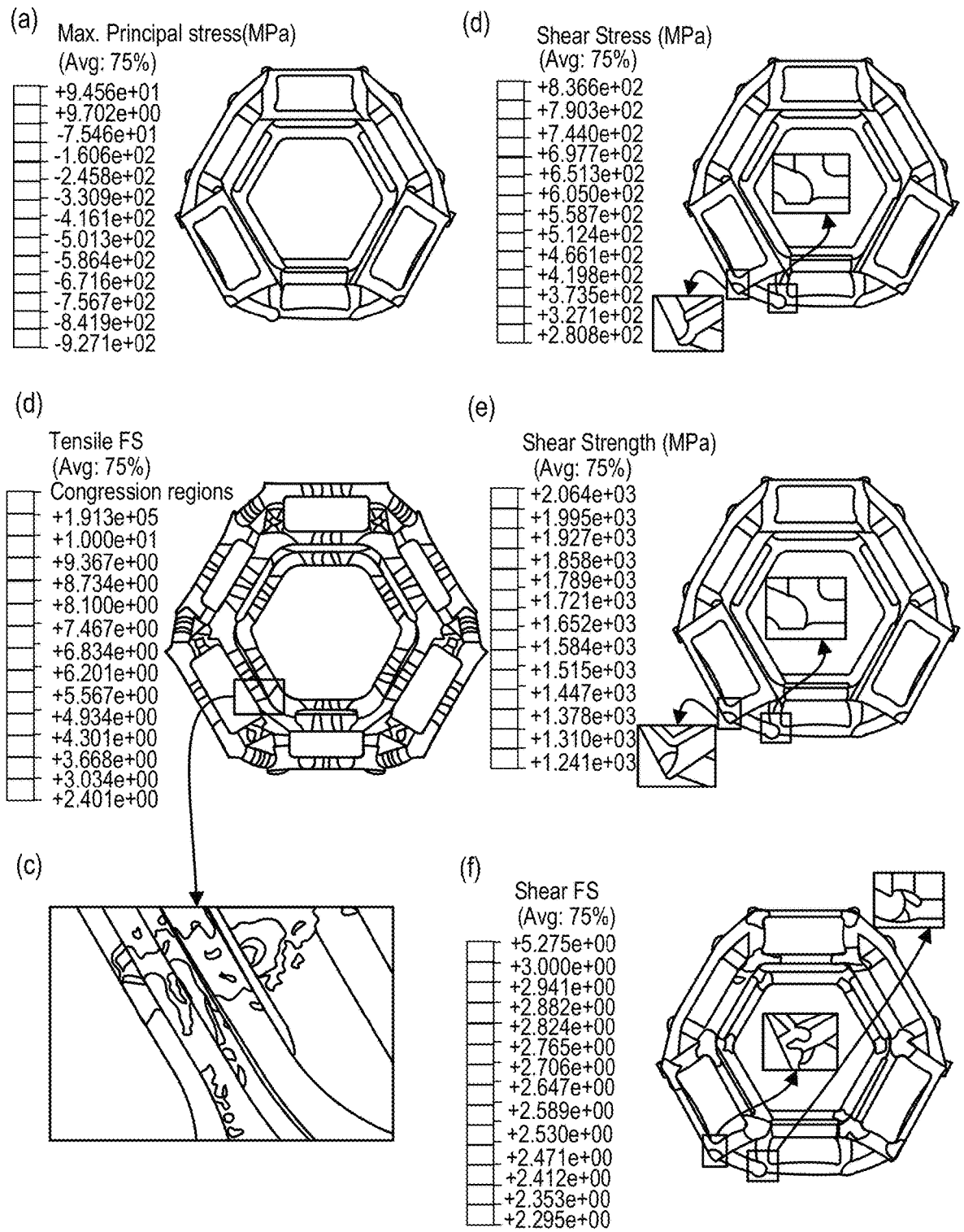

FIG. 25 shows stress analysis results for the optimized geometry with $\bar{\rho}=2.00\%$ relative density: (a) maximum principal stress field; (b) tensile FS field; (c) critical eigen mode from buckling analysis of the 2×2×2 tessellation of the optimized geometry; (d) Shear stress field; (e) Shear strength determined from the local pressure stress fields and EMC model; and (f) Shear FS field.

Figure 26:
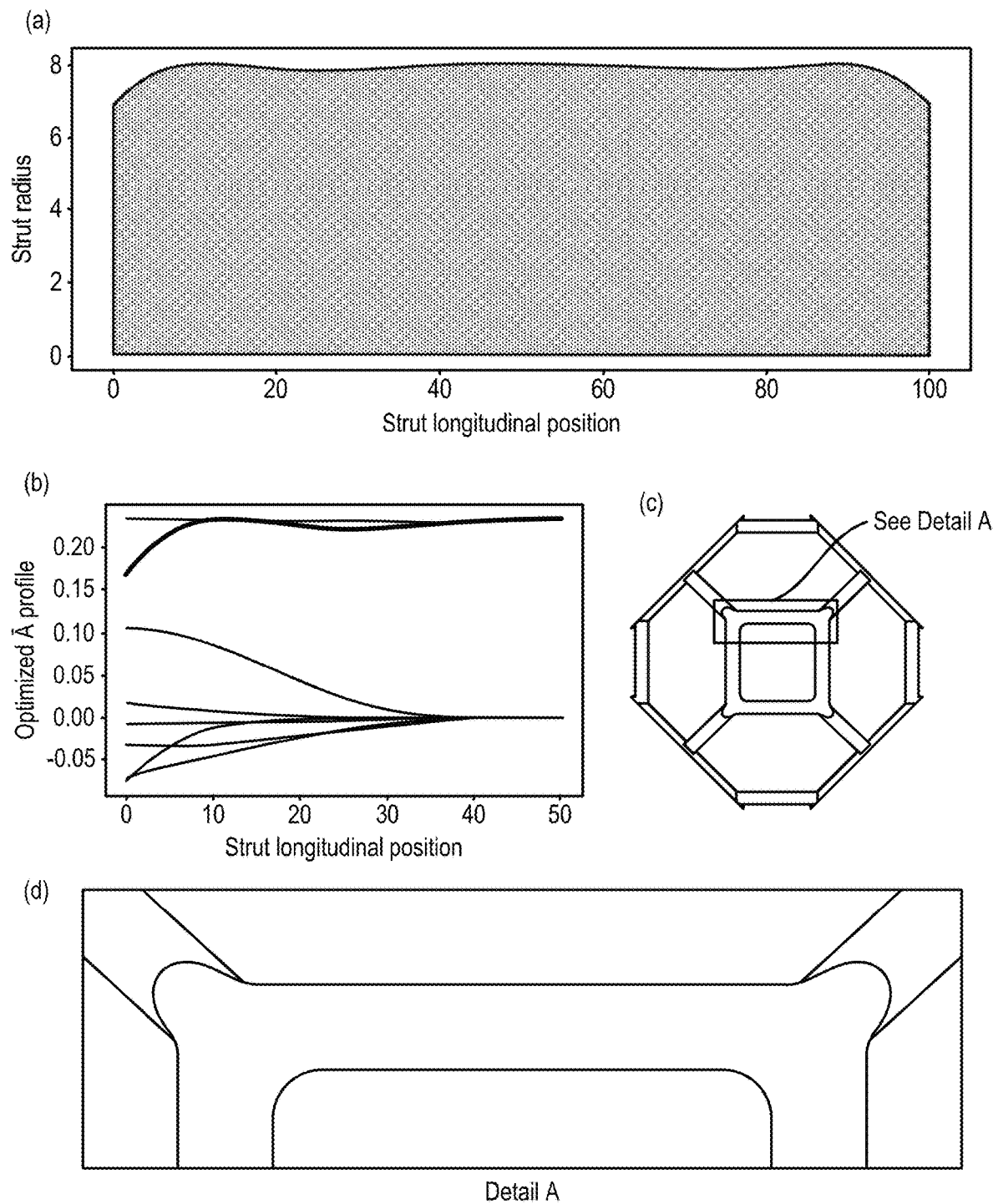

FIG. 26 shows geometric details of the $\bar{\rho}=2.00\%$ optimized unit cell geometry with solid struts obtained by minimizing $$\frac{1}{FS}:$$

(a) profile of the revolved section used to generate the struts; (b) optimal normalized cross-sectional area $A^-$ along the length of the struts; (c) Kelvin unit cell with optimized geometry; and (d) Cross-sectional view highlighting a single strut and nodal geometry.

Figure 27:
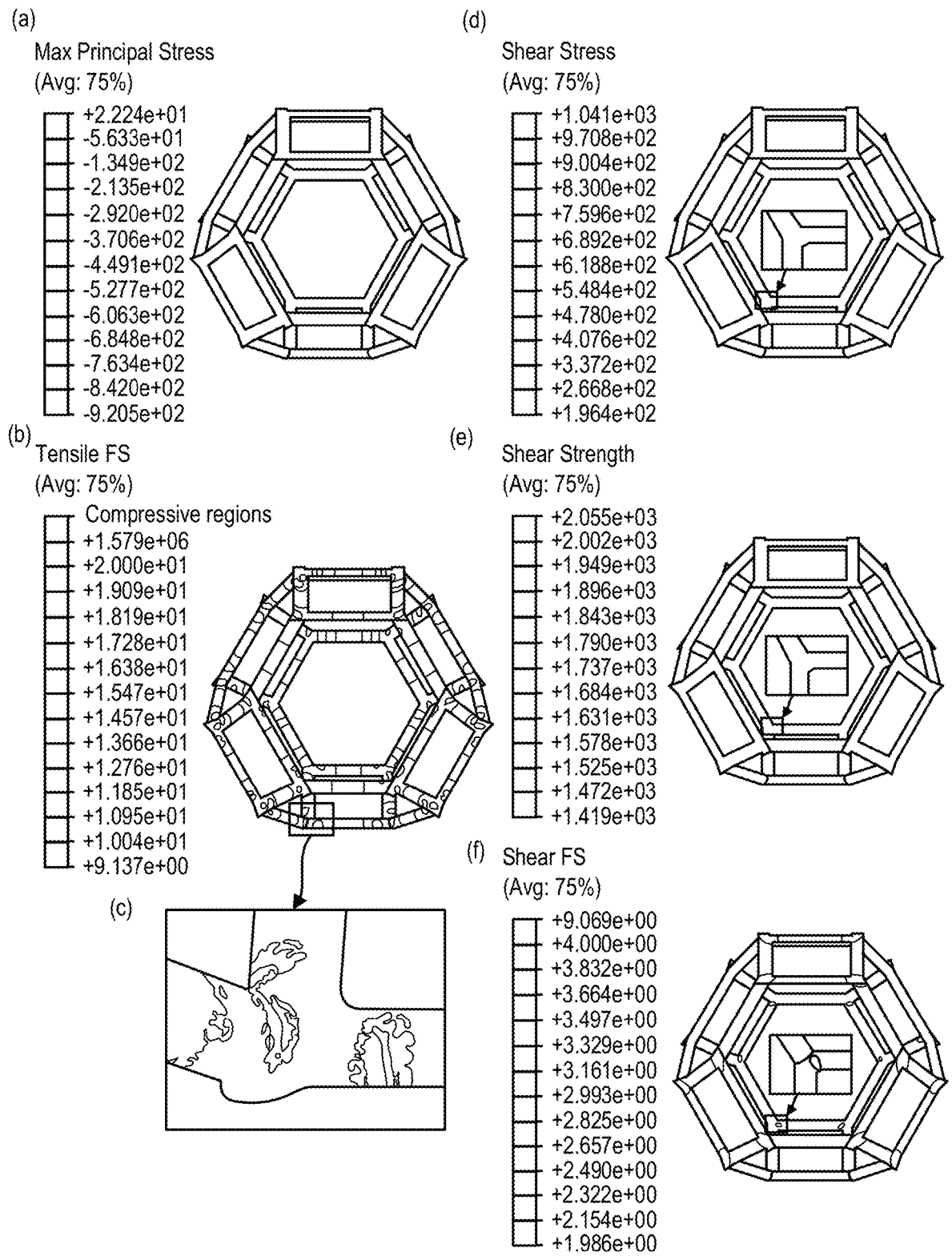

FIG. 27 shows stress analysis results for the optimized geometry with solid cross section struts and $\bar{\rho}=2.00\%$ relative density. (a) maximum principal stress field; (b) tensile FS field; (c) tensile FS in the shell cover; (d) shear stress field; (e) shear strength determined from the local pressure stress fields and EMC model; and (f) shear FS field.

FIG. 28 shows Table 1—FS for baseline cases. Limiting FS shown in bold font. Uniform geometry is defined by the strut slenderness ratio $$\lambda = \frac{L}{d}$$

and strut wall thickness $$\beta = \frac{d}{t}.$$

FIG. 29 shows Table 2—FS for optimized models.
FIG. 30 shows Table 3—thermal conductivity of the optimized models.
FIG. 31 shows Table A1—optimized design variables (correspond to A) and fillet radius.
FIG. 32 shows Table A2—optimized design variables (correspond to R).

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g., the phrase "x to y" includes the range from 'x' to 'y' as well as the range greater than 'x' and less than 'y'. The range can also be expressed as an upper limit, e.g., 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a" "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g., given data set, art accepted standard, and/or with e.g., a given confidence interval (e.g., 90%, 95%, or more confidence interval from the mean), such as variations of +/−10% or less, +1-5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

The term "molecular weight", as used herein, can generally refer to the mass or average mass of a material. If a polymer or oligomer, the molecular weight can refer to the relative average chain length or relative chain mass of the bulk polymer. In practice, the molecular weight of polymers and oligomers can be estimated or characterized in various ways including gel permeation chromatography (GPC) or capillary viscometry. GPC molecular weights are reported as the weight-average molecular weight ($M_w$) as opposed to the number-average molecular weight ($M_a$). Capillary viscometry provides estimates of molecular weight as the inherent viscosity determined from a dilute polymer solution using a particular set of concentration, temperature, and solvent conditions.

As used herein, "substantially pure" can mean an object species is the predominant species present (i.e., on a molar basis it is more abundant than any other individual species in the composition), and preferably a substantially purified fraction is a composition wherein the object species comprises about 50 percent of all species present. Generally, a substantially pure composition will comprise more than about 80 percent of all species present in the composition, more preferably more than about 85%, 90%, 95%, and 99%. Most preferably, the object species is purified to essential homogeneity (contaminant species cannot be detected in the composition by conventional detection methods) wherein the composition consists essentially of a single species.

As used interchangeably herein, the terms "sufficient" and "effective," can refer to an amount (e.g., mass, volume, dosage, concentration, and/or time period) needed to achieve one or more desired and/or stated result(s). For example, a therapeutically effective amount refers to an amount needed to achieve one or more therapeutic effects.

As used herein, "tangible medium of expression" refers to a medium that is physically tangible or accessible and is not a mere abstract thought or an unrecorded spoken word. "Tangible medium of expression" includes, but is not limited to, words on a cellulosic or plastic material, or data stored in a suitable computer readable memory form. The data can be stored on a unit device, such as a flash memory or CD-ROM or on a server that can be accessed by a user via, e.g., a web interface.

As used herein, the terms "weight percent," "wt %," and "wt. %," which can be used interchangeably, indicate the percent by weight of a given component based on the total weight of a composition of which it is a component, unless otherwise specified. That is, unless otherwise specified, all wt % values are based on the total weight of the composition. It should be understood that the sum of wt % values for all components in a disclosed composition or formulation are equal to 100. Alternatively, if the wt % value is based on the total weight of a subset of components in a composition, it should be understood that the sum of wt % values the specified components in the disclosed composition or formulation are equal to 100.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

Kits

Any of the methods or compounds described herein can be presented as a combination kit. As used herein, the terms "combination kit" or "kit of parts" refers to the compounds, methods, and any additional components that are used to package, sell, market, deliver, and/or administer the combination of elements or a single element, such as the methods and compounds disclosed herein. Such additional components include, but are not limited to, packaging, blister packages, containers, and the like. When one or more of the compounds or methods described herein or a combination thereof (e.g., compounds contained in the kit are provided or used simultaneously, the combination kit can contain the compound in a single embodiment or in separate embodiments. When the methods or compounds described herein or a combination thereof and/or kit components are not provided simultaneously, the combination kit can contain each agent or other component in separate embodiments. The separate kit components can be contained in a single package or in separate packages within the kit.

In some embodiments, the combination kit also includes instructions printed on or otherwise contained in a tangible medium of expression. The instructions can provide information regarding the content of the compounds or use of the methods, safety information regarding the content of the compounds and implementation of the methods, recommendations for use, and/or recommended applications for the compound(s) and/or methods contained therein. In some embodiments, the instructions can provide directions and protocols for administering the compounds and/or methods. In some embodiments, the instructions can provide one or more embodiments of the methods for application or use of the compounds thereof, such as any of the methods described in greater detail elsewhere herein.

The present disclosure provides for identification of a new theoretical limit for ceramic architected materials from fundamental mechanics and MohrCoulomb type behavior (i.e., stress state dependent failure envelopes). Better than linear scaling between strength and relative density for cellular materials is analytically found. Geometric optimization of ceramic architected materials realizes most of the theoretically possible increase in strength over baseline geometries and verifies that better than linear strength scaling can be realized in fully developed designs. The primary material to enable a vacuum airship for flight on Venus is designed to produce $$43 \frac{kg}{m^3}$$

of lift with thermal conductivity as low as $$0.14 \frac{W}{m \cdot K}.$$

Venus, known for its challenging environment with high temperature, pressure, and corrosive atmosphere, presents a longstanding challenge for planetary exploration. The current disclosure investigates the prospect of using a vacuum airship to overcome these challenges, where low-density ceramic truss-lattice architected materials comprise the primary structure. This approach exploits the pressure sensitive shear strength of ceramic materials, for which a new Gibson-Ashby type scaling relationship is developed between strength and relative density. Notably, this produces better than linear scaling, with scaling exponents far less than one. Elementary analysis is used to formulate theoretical limits for the compressive strength, minimum density, and minimum thermal conductivity for truss lattice materials subjected to hydrostatic pressure loads. Shape optimization is conducted on silicon carbide Kelvin cells with variable cross-section axisymmetric struts considering three failure modes: buckling, tensile rupture, and shear failure. The best fit strength scaling relationship for optimized designs validates the analytical scaling relationship with better than linear strength scaling. These optimized designs are found to withstand the extreme loading conditions on Venus while providing up to $$43 \frac{kg}{m^3}$$

of buoyancy. Most of the available strength improvement between baseline designs and the newly developed theoretical limit is reached by the optimized designs and the effect of geometric imperfections on the strength is considered. The thermal conductivity of the optimized designs are simulated and found to be less than $$0.5 \frac{W}{m \cdot K},$$

with one design outperforming silica aerogels at elevated temperature.

A long duration mission to explore the surface of Venus has remained out of reach. Such a mission could provide a wealth of information about the geological history, surface chemistry, mineralogy, energy balance, and tectonic activity on Venus. These investigations would provide us with new opportunities to understand the formation of planets hospitable to life, the runaway greenhouse effect, and the potential habitability of exoplanets.

The USSR successfully conducted ten lander missions to Venus between 1970 and 1985. The Venera and Vega missions substantially advanced our understanding of Venus, including measurements of the extreme pressure and temperature on its surface, determination of the atmospheric composition and density, and provided our only images of the rocky surface. Several contemporary rover and lander missions have been proposed. Zephyr, would harness wind energy on the surface for mobility with a science package capable of operating under ambient conditions. See, Landis, Oleson and Grantier (2014). ALIVE would be a stationary lander with an environmentally shielded science package that operates for five days, until the lithium fuel powering the stirling duplex system is depleted. See, Oleson (2018). Similar landers making use of plutonium general power heat sources have been proposed with expected lifetimes of at least one year. See, Dyson and Bruder (2010). Overall, surface mobility is challenged by the heavy structures required for environmental protection of a science package.

The development of any system operating in the lower atmosphere of Venus requires unique consideration to ensure compatibility with the challenging environmental conditions, especially the extreme temperature, corrosive chemical composition, and high atmospheric pressure. The temperature at the surface of Venus is 464° C., hot enough to degrade the mechanical properties of most materials. See, Lebonnois and Schubert (2017). The composition is supercritical $CO_2$ with corrosive trace gases that readily react with many materials. See, Lukco, Spry, Neudeck, Nakley, Phillips, Okojie and Hunter (2020); Costa, Jacobson, Lukco, Hunter, Nakley, Radoman-Shaw and Harvey (2017). The atmospheric pressure is a crushing 9.2 MPa, a consequence of the heavy atmosphere with a density of around $$65 \frac{kg}{m^3}$$

at the surface.

Figure 1:
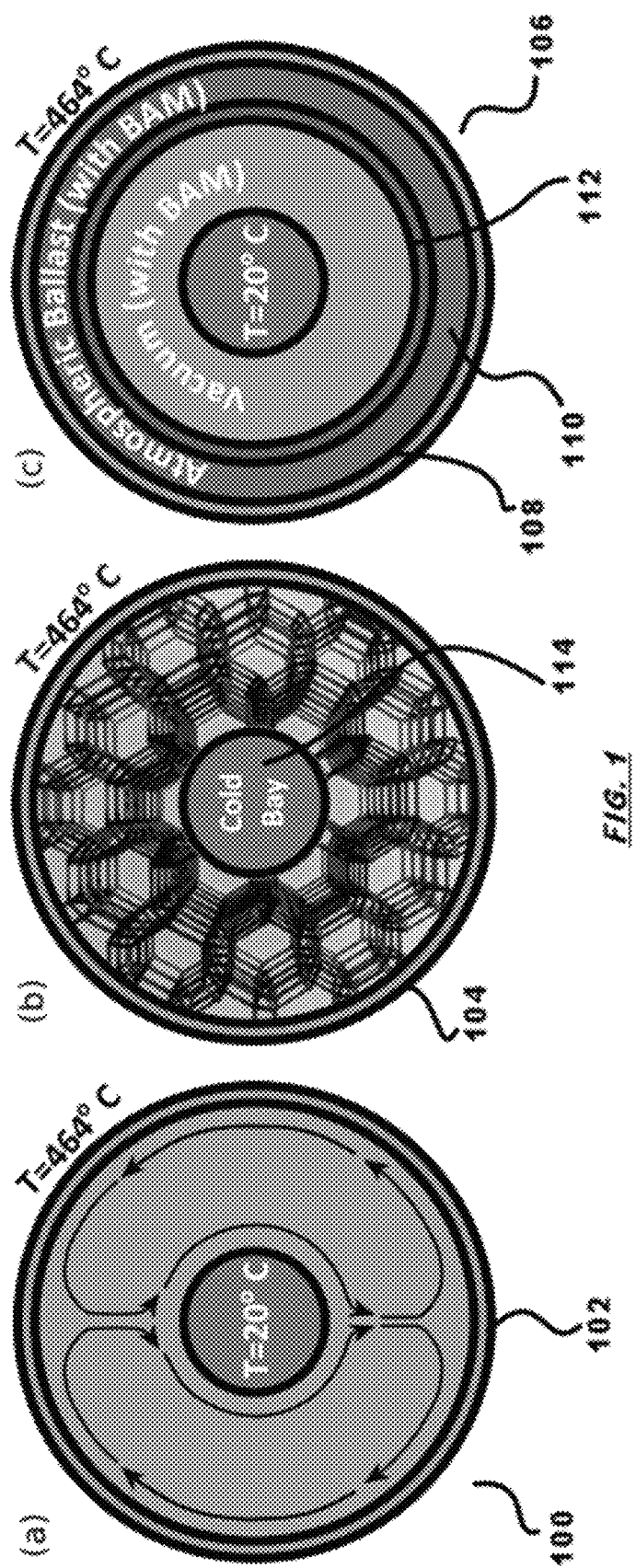
FIG. 1 shows at: (a) cross-section of a vacuum airship with an example BAM; (b) buoyancy driven circulation in a fluid filled balloon; and (c) Vacuum airship model with two BAM vessels, one of which can be flooded with atmospheric gas as ballast.

The exceptionally high atmospheric density admits an unlikely solution—a vacuum airship (see FIG. 1), FIG. 1 shows at: (a) cross-section of a vacuum airship 100 with an example buoyant architected material (BAM) 102; (b) buoyancy driven circulation in a fluid filled balloon or chamber 104; (c) Vacuum airship model 106 with two BAM vessels 108 and 110, one of which, see 108, can be flooded with atmospheric gas 112 as ballast.

This approach may offer unprecedented mobility and environmental protection for Venus, however it has not been developed or tested for Venus exploration. Furthermore, the technical challenges of developing a vacuum airship for interplanetary exploration remains a significant obstacle. As of now, their viability as an alternative to established methods of flight has been dubious. Nonetheless, a vacuum airship has unique advantages over traditional balloons for operation on Venus, including: i) dramatically reduced cooling requirements enabled by housing instrumentation in the thermally isolated vacuum chamber 114 (see FIG. 1 at b) a longer lifetime enabled by maintenance of buoyancy via vacuum regeneration without the need for a supply of lifting gas, and iii) exceedingly reliable altitude control through the use of atmospheric gas as ballast (see FIG. 1 at c).

The development of vacuum airships has been a long-standing challenge in the field of aeronautics due to the unique structural requirements. Traditionally, the structures considered have been thick wall or stiffened shells, however, the use of load bearing interior materials has recently been explored. See, Clarke, Rimoli, Gloyd, Logarzo and Kraus (2018); Jenett, Gregg and Cheung (2019). In the simple case where the interior material completely supports the external pressure of the gas (i.e., the envelope is not load-bearing), the design challenge is to find a material that can support this load while maintaining a density less than the gas that is displaced. Consequently, the relationship between the strength of the interior material and its relative density plays a critical role. Lattice type materials are known to be among the best performing in this space. See, Bauer, Schroer, Schwaiger and Kraft (2016); Zheng, Smith, Jackson, Moran, Cui, Chen, Ye, Fang, Rodriguez, Weisgraber et al. (2016); Zhang, Vyatskikh, Gao, Greer and Li (2019). They exhibit a nonlinear relationship between strength and relative density Gibson and Ashby (1999); Huber, Viswanath, Mameka, Markmann and Weißmuller (2014); Meza, Phlipot, Portela, Maggi, Montemayor, Comella, Kochmann and Greer (2017); Portela, Greer and Kochmann (2018), with higher specific strengths for designs with higher relative density. Thus, dense environments like the lower atmosphere of Venus offer a unique opportunity for the development of lattice materials that can enable the construction of a vacuum airship.

To realize this opportunity, catastrophic buckling of the lighter than atmosphere lattices under compressive loading must be avoided. The buckling strength of lattice materials has an unfavorable quadratic scaling with relative density. See, Gibson, Ashby, Schajer and Robertson (1982). Fortunately, the buckling strength is exceptionally sensitive to the geometric arrangement of material in a lattice, and the design of buckling resistant geometries is common practice in engineering. Some examples in this case include transforming solid cross-section struts into hollow cross-sections struts in structural systems or truss lattice material. See, Queheillalt and Wadley (2005); Timoshenko and Gere (2009); Pingle, Fleck, Deshpande and Wadley (2011), or introducing hierarchy to the network of structures and materials Lakes (1993); Meza, Zelhofer, Clarke, Mateos, Kochmann and Greer (2015); Emami and Gross (2023). The degree to which these geometric modifications can be exploited must be balanced against other failure limits in the material. For example, hollow lattice materials tend to create larger stress concentrations in nodal regions than their solid-section counterparts, which can lead to yielding in metallic lattices. See, Torrents, Schaedler, Jacobsen, Carter and Valdevit (2012) or localized cracking in ceramic lattices Meza, Das and Greer (2014).

Many ceramic materials have low density, high hardness, and high compressive strength. Ceramics are used in many engineering applications, especially in extreme thermal and chemical environments, however their low fracture toughness limits their application in structural applications. A distinctive feature of ceramics is their pressure stress sensitivity. When the pressure stress P is small, shear failure is dominated by crack propagation and the critical shear stress if greatly increases with pressure stress P according to a nearly linear relationship. The increase in critical shear stress if diminishes as the pressure stress P takes extreme values (e.g., 5 GPa and above for SiC) and the mechanism of shear failure transitions to plasticity. See, Heard and Cline (1980); Brannon, Lee and Bronowski (2005). One of the pressure-sensitive constitutive models capable of capturing this behavior in ceramic materials is the extended Mohr-Coulomb model. See, Bavdekar and Subhash (2018). Furthermore, this characteristic makes ceramics particularly suitable to support extreme pressure loading, such as the atmospheric pressure on Venus or hydrostatic loading on deep-sea structures and vehicles. Exploiting the pressure sensitivity could offer an unprecedented advantage in high pressurize environments and pave the way for innovative structures that enable new space and deep-sea missions.

The current disclosure establishes the theoretical performance limit for low density truss-lattice materials made from ceramic parent materials subjected to hydrostatic loading and explores the optimal geometry that approaches this limit. The interplay between the stress distribution in the lattice and the conditions that cause material failure are exploited to achieve new designs that mitigate buckling and reside substantially closer to the theoretical limit than baseline designs with uniform cross-sectional geometry. The design is focused on what the current disclosure terms a buoyant architected material (BAM). That is, a material that when sealed in a nonstructural vacuum envelope has sufficient strength to withstand the external fluid pressure and has a density less than or equal to that of the fluid it displaces. Finite element modeling (FEM) and shape optimization are used to generate several BAM designs that are compatible with the lower atmosphere of Venus. The sensitivity of the designs to imperfections is investigated in order to evaluate their performance in the presence of defects. Lastly, thermal transport in the designs are determined to assess their performance as structural insulators.

Feasibility Disclosure and Theoretical Limits

To design a BAM that meets the constraints imposed by the extreme environment on Venus (atmospheric density $\rho=65$ kg/m$^3$, atmospheric pressure p=9.2 MPa, and surface temperature T=464° C.), the material architecture and composition must be carefully selected. The unit cell architecture should maximize mechanical stability at low relative density while the parent material must resist chemical reactivity with the atmosphere and maintain mechanical properties at high temperatures. Low thermal conductivity is also preferred to reduce cooling requirements for a cold bay housing instruments nested in the vacuum chamber. See, FIG. 1.

Parent Material and Theoretical Limit

The constraints imposed by the extreme environment on Venus for an admissible BAM eliminates most materials from the design space, leaving only a few metallic and ceramic materials as candidate parent materials for a BAM to operate on Venus. Among the metallic materials, Ti-6A1-4V is a strong candidate providing high strength and stiffness, low thermal conductivity, and low density compared to other metals. The yield strength of Ti-6A1-4V at ambient Venus temperatures is 650 MPa and a relative density $\bar{\rho}=1.46\%$ is required for neutral buoyancy. Assuming a linear scaling of strength and relative density $$\left(\bar{\sigma}_f = \frac{1}{3}\bar{\rho}\sigma_f\right),$$

which can be found in stretching-dominated architectures. See, Dong, Deshpande and Wadley (2015), a Ti-6A1-4V BAM with a yield strength of 650 MPa is estimated to be far from feasible, with a factor of safety (FS) of around 0.34. This FS is estimated with the assumption of yield failure of the parent material; however, the likelihood of buckling instability at this low relative density would further lower the FS. Although more suitable metals may exist than Ti-6A1-4V, the great disparity between the properties of Ti-6A1-4V and what is required for a BAM suggested that other material classes should be investigated. No polymeric materials are suitable due to the high temperatures (including fiber reinforced polymers), therefore ceramic materials are considered next.

Ceramic materials are rarely used as the primary structure in high stress applications due to their low fracture toughness and susceptibility to failure under tensile loading. Since BAMs are macroscopically subjected to hydrostatic pressure, their design can be tailored to completely eliminate tensile stresses and circumvent this weakness of ceramic materials. Separately, the strength of truss-lattice materials is typically limited by large stress concentrations at the nodal regions. This weakness of truss-lattice materials can be compensated for with ceramic materials, which enjoy remarkable enhancement of strength with increased pressure stress, which is also large in the nodal regions of a BAM. Thus, investigating BAMs with ceramic materials brings together a never before investigated synergy of material architecture, fundamental material behavior, and loading conditions to produce architected materials with extremely low density and remarkably high strength.

At any material point, the pressure stress is defined as the negative of the spherical component of the stress tensor P=−tr($\sigma$)3. Assuming a ceramic material like SiC, the effect of pressure stress on the shear strength can be captured by an extended Mohr-Coulomb model, see Bavdekar and Subhash (2018), with the form in Eq. 1 (with units of GPa).

$$\tau_f = 7.02 - 6.11e^{-0.264P} \tag{1}$$

Figure 2:
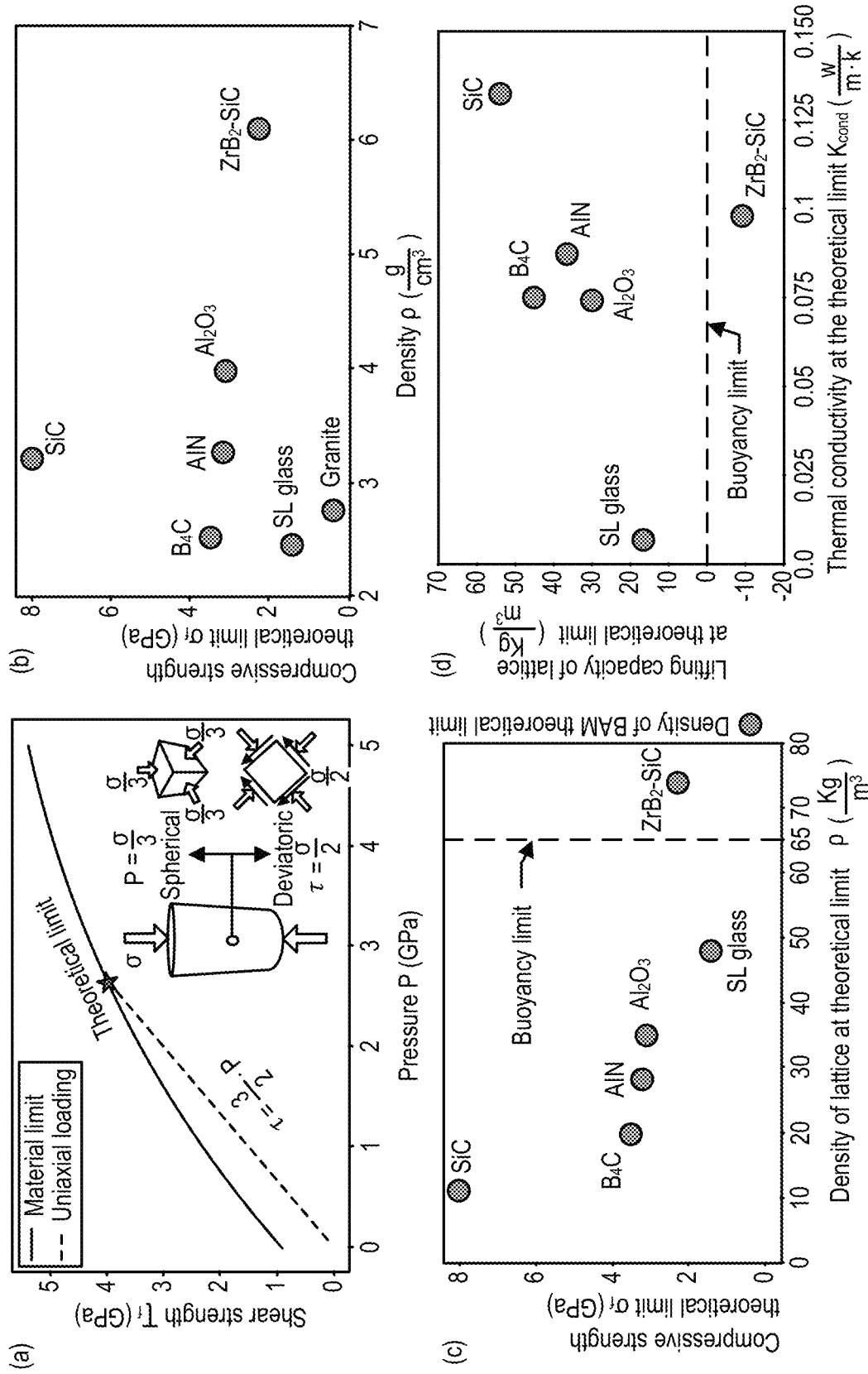
FIG. 2 shows at: (a) SiC theoretical strength limit for struts under uniaxial compression; (b) theoretical limit of compressive strength for common ceramic materials; (c) theoretical limit of compressive strength for common ceramic materials and their corresponding truss lattice densities; and (d) thermal conductivity ($K_{cond}$) and lifting power on Venus at the minimum allowable relative density ($\bar{\rho}$).

FIG. 2 at a shows the intersection of this curve with the line defined by the relationship between pressure stress and shear stress acting within the strut of a stretching dominated truss lattice. This provides a new theoretical limit for the strength of ceramic truss-lattice materials (FIG. 2 at b). FIG. 2 shows at: (a) SiC theoretical strength limit for struts under uniaxial compression. The limit is identified as the intersection of the pressure stress sensitive shear strength of the parent material with the pressure-shear relation for a strut; (b) theoretical limit of compressive strength for common ceramic materials; (c) Theoretical limit of compressive strength for common ceramic materials and their corresponding truss lattice densities; (d) thermal conductivity ($K_{cond}$) and lifting power on Venus at the minimum allowable relative density ($\bar{\rho}$). Properties at room temperature are used for (a)-(d).

This new theoretical limit provides an absolute measure by which the performance of a truss-lattice based BAMs with a common parent material can be evaluated. Assuming a stretching dominated lattice composed of SiC material under hydrostatic pressure (where the strength scales as $$\bar{\sigma}_f = \frac{1}{3}\bar{\rho}\sigma_f\Big),$$

the theoretical limit for a BAM operating on Venus is $\bar{\rho}=0.34\%$. This places a lower bound on the minimum feasible relative density for the BAM. We note that this simple theoretical limit disregards the complex multiaxial stress field that exists in the nodal region of truss lattice materials and assumes an idealized purely uniaxial compressive stress state within the strut. Specific analysis of particular truss lattice architectures, see, Zhu, Knott and Mills (1997); Deshpande, Fleck and Ashby (2001), would likely yield more restrictive lower bounds on the minimum relative density. Nonetheless, the large range of relative density $0.34\%<\bar{\rho}<2\%$ between the theoretical strength limit and neutral buoyancy limit provides enough design freedom to motivate the search for fully defined BAM designs.

It can be seen in FIG. 2 at b that Silicon carbide (SiC) possesses a combination of low density and high compressive strength at the theoretical limit. This combination makes SiC BAMs on the theoretical limit to have the least density among all parent materials considered (see FIG. 2 at c). Additionally, the mechanical properties of SiC are less sensitive to the high temperature on Venus compared to some other candidates, such as $Al_2O_3$, which can experience significant degradation in stiffness and strength at Venus atmospheric temperatures. See, Shackelford and Alexander (2001); Bansal (2005). The high flexural strength (694±48 MPa), see Zhang, Jiang, Lin, Chen and Huang (2013), and high elastic modulus (~345 GPa) at 500° C., see Magnani, Minoccari and Pilotti (2000); Keppeler, Reichert, Broadley, Thurn, Wiedmann and Aldinger (1998); Sanchez-Gonzilez, Miranda, Guiberteau and Pajares (2011); Bansal (2005); Shackelford and Alexander (2001), are also important properties to ensure that the theoretical strength can be reached before buckling and tensile rupture failure modes are activated. Critically, SiC also exhibits excellent chemical compatibility with the corrosive conditions on Venus Costa et al. (2017); Lukco et al. (2020).

FIG. 2 at d shows the relationship between buoyancy generated lift and thermal conductivity of simple cubic ceramic truss lattice materials at the minimum theoretical relative density. SiC is observed to provide the greatest lifting capacity for a BAM but also possesses the greatest thermal conductivity. While the low density (high lifting capacity) and high strength of SiC make it mechanically superior to other common ceramic materials for use as a BAM, its high thermal conductivity (114 W/m·K for SiC with less than 1 wt % boron and carbon addictive at room temperature Munro (1997)) is not a favorable property, as it leads to increased cooling requirements for a mission to Venus. Fortunately, the thermal conductivity of SiC decreases at higher temperature, with a thermal conductivity of 58W/m—K at 464° C., see Munro (1997); Bansal (2005); Shackelford and Alexander (2001). The current disclosure notes that the fabrication of truss-lattice materials from gelcast and dip coat SiC has been successfully demonstrated Tu and Jiang (2018); Ortona, D'Angelo, Gianella and Gaia (2012).

In this disclosure, we use E=345 GPa and v=0.21 for the elastic properties of SiC at 464° C. Tensile and shear failure modes of the SiC parent material are considered in this disclosure. This disclosure assumes tensile failure to occur when the maximum principal stress reaches σ=200 MPa. This conservative limit provides a generous buffer to account for geometric defects from manufacturing. Due to the absence of statistical data, this conservative limit also ensures that the designs are still valid in the case of a low Weibull modulus. The shear failure mode is included with its sensitivity to the local pressure stress P in the material using Eq. 1. Inclusion of the pressure sensitive shear strength in the design process is essential to avoid excess material in high-pressure regions of the BAM.

Strength Scaling Relationship for Pressure Sensitive Parent Materials

Using the EMC model, the pressure stress sensitive strength of stretching dominated lattice materials can be developed as a function of the unit cell relative density $\bar{\rho}$. The average pressure stress in any cellular material subjected to an applied pressure Pe can be found using Eq. 2.

$$\bar{P} = \frac{P_e}{\bar{\rho}} \quad (2)$$

With the pressure stress in the struts $\bar{\rho}$-determined, the EMC model can be expressed as a function of relative density $\bar{\rho}$ and applied pressure $P_e$, as shown in Eq. 3. In this equation, the coefficients a, b, and k represent the constitutive model parameters. Coefficients for common ceramic materials can be found in Reference Bavdekar and Subhash (2018). Additionally, $\sigma_{Hel}$ and $P_{Hel}$ represent the strength and pressure at the materials Hugoniot elastic limit (HEL). See, Bavdekar and Subhash (2018). By utilizing Eq. 3, the current disclosure can evaluate the pressure sensitive compressive strength of ceramic parent materials comprising a stretching dominated lattice as a function of relative density $\bar{\rho}$ and applied pressure $P_e$.

$$\sigma_f = \sigma_{Hel}\left(a + b \cdot e^{\left(-k \cdot \frac{P_e}{\bar{\rho} \cdot P_{Hel}}\right)}\right) \quad (3)$$

It is valuable to investigate how this enhancement in the strength of ceramic materials affects the strength and scaling relation for stretching dominated truss lattices when they are subjected to hydrostatic pressure. By substituting the pressure sensitive strength expression, $\sigma_f$, into the scaling relation for the strength of stretching dominated lattices, a new strength scaling relation can be derived as presented in Eq. 4, and illustrated in FIG. 3 at a. Comparison of the new scaling relationship to classical linear scaling in FIG. 3 at a shows that the pressure induced strengthening is substantial in many ceramics as the relative density becomes low. Furthermore, each material has unique behavior. Low strength materials (e.g., granite) harness greater benefit from the pressure stress at high relative densities than higher strength materials (e.g., SiC).

Figure 3:
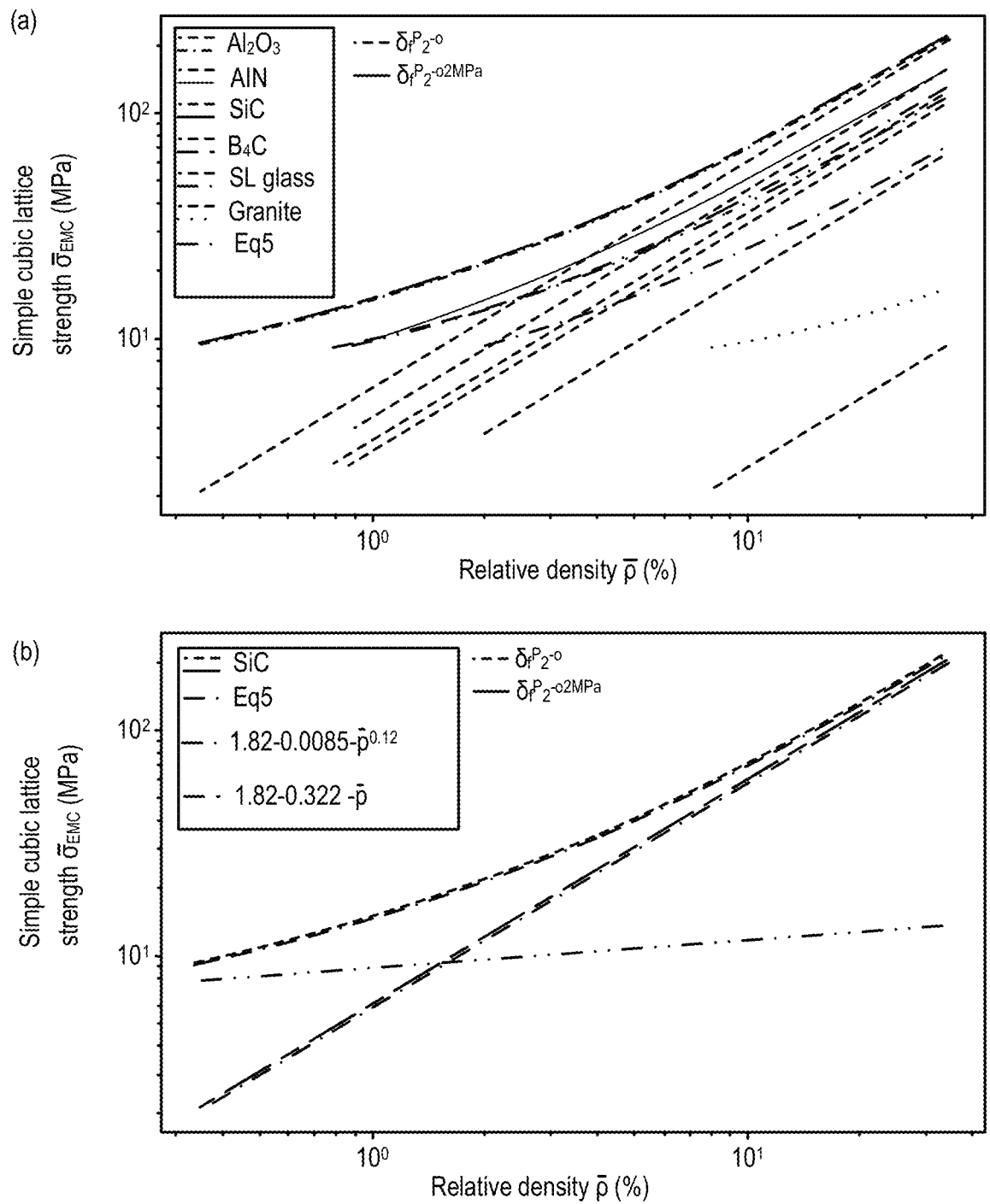
FIG. 3 shows at: (a) the impact of confinement pressure stress on the strength scaling relation for a stretching dominated simple cubic lattice under a hydrostatic pressure of 9.2 MPa; and (b) new two term strength scaling relation and the decomposition of its linear and nonlinear terms.

Similar to the works of Andersen, Wang and Sigmund (2021); Portela et al. (2018), a two-term scaling relationship Eq. 5 is developed using a combination of linear and nonlinear terms to approximate the strength of SiC across the entire range of relative densities. In this equation, 1.82 GPa represents the compressive strength of SiC in the absence of pressure stress. Furthermore, FIG. 3 at b represents the new two-term scaling relation and the decomposition of its linear and nonlinear components. FIG. 3 shows: (a) the impact of confinement pressure stress on the strength scaling relation for a stretching dominated simple cubic lattice under a hydrostatic pressure of 9.2 MPa. Curves for each material terminate at the minimum allowable relative density $\bar{\rho}$. Pressure sensitivity of the shear strength provides the strength improvements up to 4 times for small relative densities $\bar{\rho}$; (b) new two term strength scaling relation and the decomposition of its linear and nonlinear terms. It can be observed that most of the strength originates from the nonlinear term at lower relative densities, whereas the linear term dominates at relative densities $\bar{\rho}>5\%$. Notably, including the pressure stress confinement effects on SiC material improves the scaling relationship between strength and relative density beyond the linear scaling traditionally observed in stretching dominated truss lattice materials. See, Gibson and Ashby (1999). The scaling exponent found here is substantially less than the only other known example of better than linear strength scaling, which has been observed for materials that exploit the relationship between strength and size. See, Cui, Hensleigh, Chen and Zheng (2018).

$$\bar{\sigma}_f = \frac{1}{3} \cdot \sigma_{Hel}\left(a + b \cdot e^{\left(-k\frac{P_e}{\bar{p} \cdot P_{Hel}}\right)}\right) \cdot \bar{p} \qquad (4)$$

$$\bar{\sigma}_f^{fit}(GPa) = 1.82 \cdot \left(0.322\bar{p} + 0.0085\bar{p}^{0.12}\right) \qquad (5)$$

Thermal Properties

In addition to considering the mechanical aspects of BAMs, examining their thermal properties is crucial. Heat transfer within BAMs in a vacuum environment occurs mainly through conductivity and radiation. The conductivity of BAMs is mainly a function of the thermal conductivity of the parent material and the relative density of the BAM. As shown in the previous section, a stretching dominated lattice composed of SiC material achieves the theoretical limit of materials at a unit cell relative density of $\bar{\rho}=0.34\%$. Assuming a simple cubic lattice at this minuscule relative density (where little overlap between the three sets of mutually orthogonal struts exist), the thermal conductivity is readily estimated as $$\frac{\bar{p}}{3} \cdot K,$$

where K is the thermal conductivity of the parent material.

Assuming the thermal conductivity for SiC is 58 W/m2 at the ambient temperature on Venus, a SiC simple cubic unit cell with a relative density of $\bar{\rho}=0.34\%$ has a thermal conductivity of 0.066W/m·K. This value can be considered as a simple theoretical lower bound for thermal conductivity of a SiC BAM operating near the surface of Venus, and subsequent numerical results in this disclosure will be compared to this bound. When comparing this theoretical thermal conductivity limit of SiC BAMs with state-of-the-art thermal insulation materials, such as silica aerogels, calcium silicate insulation, and ceramic fiber insulation materials, it becomes evident that although some of these materials, like aerogel insulation, exhibit lower thermal conductivity at room temperature (0.02W/m—K), at higher temperatures, specifically at 500° C., their thermal conductivity increases to be larger than that of the ideal SiC BAM (for aerogels, it increases to 0.18W/m—K). See, Moore, Siegel, Kolb, Vernon and Ho (2010); Wei, Liu, Zhang, Yu and Du (2011); Headley, Hileman, Robbins, Piekos, Stirrup and Roberts (2019); Wei et al. (2011). SiC BAMs also have favorable thermal conductivity in relation to lifting gases like Helium, a topic that will be further elaborated upon herein. Furthermore, the SiC BAM possesses far greater load bearing capacity than alternatives with similar density and conductivity. The likelihood of SiC BAMs to provide thermomechanical properties that have not been achieved in other materials has the potential to open new applications, including that of interplanetary exploration. In addition to the thermal conductivity, at high temperatures, radiative properties of BAMs can play a significant role in thermal transport. A theoretical limit for radiative transport is not considered in this disclosure because this property is highly sensitive to relative density, architecture type, cell size, and the optical properties of the parent materials, See, Coquard, Rochais and Baillis (2012); Sans, Schick, Parent and Farges (2020). The broad range of these factors makes it challenging to formulate a theoretical limit for radiative transport. Furthermore, the impact of radiative transport can be mitigated by applying a low emissivity coating to the BAM and radiation shields, which helps limit radiative heat transfer, see Zhu (2018); Zhu and Miller (2004). In this disclosure, the radiative transport of the designs will be analytically evaluated, however, these values will not be discussed relative to any theoretical limit.

Unit Cell Architecture

Figure 4:
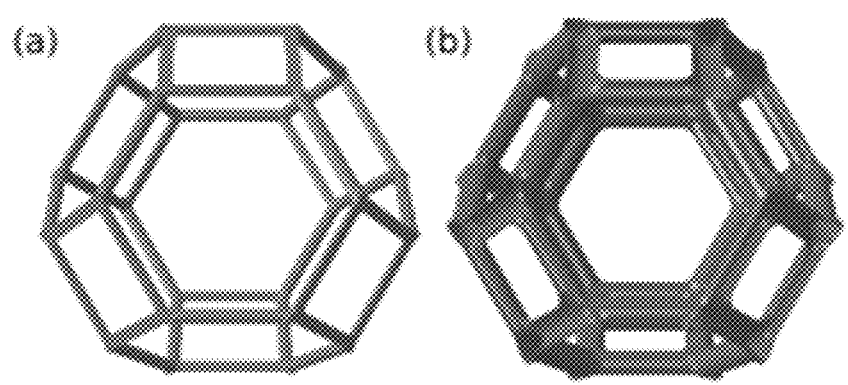
FIG. 4 shows baseline BAMs with relative density of $\bar{\rho}=1\%$: (a) uniform solid struts; and (b) uniform hollow struts sized to simultaneously maximize the critical Euler and shell buckling pressures.

The Kelvin truss-lattice (tetrakaidecahedron cell) (FIG. 4) is selected for the BAMs designed in this disclosure. See, Thomson (1887); Reinelt and Kraynik (1993). FIG. 4 shows baseline BAMs with relative density of $\bar{\rho}=1\%$: (a) uniform solid struts; and (b) uniform hollow struts sized to simultaneously maximize the critical Euler and shell buckling pressures. The mechanical behavior of truss-lattice materials are typically sensitive to whether the topology of the architecture promotes bending or stretching dominated deformation in the struts. Although the Kelvin is bending dominated under most loading conditions, it exhibits stretching dominated behavior (linear scaling between stiffness and density) under pressure loading See, Grenestedt and Bassinet (2000). Additionally, this unit cell has lower relative density than most other architectures (e.g., octet) for a given strut slenderness ratio λ (L/d, where L and d stand in for the length and the diameter of the struts, respectively). This has a favorable effect on the critical buckling load at low relative densities, which is essential since SiC based BAMs must have relative densities $\bar{\rho}<2\%$ to meet the buoyancy requirement. However, at these low densities, all lattice materials, including the Kelvin truss lattice, are extremely susceptible to buckling. Euler buckling of solid cross section struts and shell buckling of thin-walled hollow struts are the two main buckling modes that result in a loss of stability and load carrying capability prior to the parent material reaching its failure limit. It should be noted that plate lattice materials, which also exhibit remarkable strength at low densities. See, Crook, Bauer, Guell Izard, Santos de Oliveira, Martins de Souza e Silva, Berger and Valdevit (2020), do not lose all load carrying capability upon buckling, see Derveni, Gross, Peterman and Gerasimidis (2022). Nonetheless, the current disclosure focuses on truss lattice materials due to their greater capacity for geometric tailoring in an effort to mitigate any buckling events.

Computational Platform for Shape Optimization

Finite Element Modeling for Stress and Buckling Analysis

FEM (ABAQUS/Standard) is used to analyze the BAM designs subjected to the atmospheric pressure found at the surface of Venus. Python scripts are created to automate FEM and post-processing of candidate designs. A set of design variables that define strut geometry are taken as inputs to these scripts to create the high-fidelity models. The resulting kelvin unit cells are finely discretized with tetrahedral elements using quadratic shape functions (C3D10). The meshing strategy plays an important role in the accuracy of the results due to the need to handle extreme designs during the optimization process and the presence of large stress gradients near free surfaces. Mesh sensitivity of the models was investigated and is detailed in FIG. 19. The mesh convergence study revealed that stress extrapolation to capture the maximum principal stresses on the free surface of the BAMs (where the critical tensile stress often exists) resulted in errors exceeding the 5% error tolerance adhered to for simulated stresses reported in this work. To address this, membrane elements (M3D6) with insignificant stiffness ($E^{membrane}=E\times10^{-4}$, and $t^{memberane}=L\times10^{-5}$, where t and L are thickness of membrane and length of a single strut, respectively) are placed on free surfaces to acquire accurate strain results. With this efficient approach, accurate models that are computationally feasible for optimization were created and analyzed. The number of elements in these models varied from $5\times10^5$ for cases with low relative densities around $\bar{\rho}=0.5\%$ to nearly $2\times10^6$ for cases near the buoyancy limit $\bar{\rho}=2.0\%$.

The elastic properties of SiC are defined and assigned to the models. To impose hydrostatic pressure, macroscopic strain corresponding to a state of pure dilatation ($\bar{\epsilon}_{11}=\bar{\epsilon}_{22}=\bar{\epsilon}_{33}=\epsilon_0<0$) was applied to the unit cell models with periodic boundary conditions (PBCs). PBCs were applied via equation constraints on the unit cell boundaries. Due to the small strain magnitudes, linear elastic behavior was assumed and geometric nonlinearity was not required. First, a static analysis is performed to calculate the effective bulk modulus $\bar{K}$ and local stress fields σ. The bulk modulus $\bar{K}$ of the architected material is obtained using the mean strain energy density ($\bar{\mu}$) from the analyses and Eq. 6. The bulk modulus and applied volumetric strain are used to scale the local stress fields 6 in the simulations so that they correspond to a pressure loading of 9.2 MPa. The membrane elements are additionally scaled by their elastic contrast with the solid elements to accurately determine the stress state on the free surfaces. The pressure stress is extracted at every integration point in the model to calculate the local shear strength $\tau f$ from the EMC model at these locations. Finally, the maximum shear and the tensile stresses at each integration point are compared to the parent material failure limits at the current level of pressure (see section 2.1) to provide factors of safety with respect to the shear and tensile failure modes. This provides a conservative measure for the FS with respect to the shear failure mode, since any stress increase would likely have a shear component (removing some margin from the current shear strength) and a pressure component (adding some margin from the current shear strength). The current disclosure neglects the increase in the shear strength $\tau f$ that would be associated with this change in pressure stress from the design value.

$$K = \frac{2 \cdot \bar{u}}{(\bar{\epsilon}_{11} + \bar{\epsilon}_{22} + \bar{\epsilon}_{33})^2} \quad (6)$$

Figure 5:
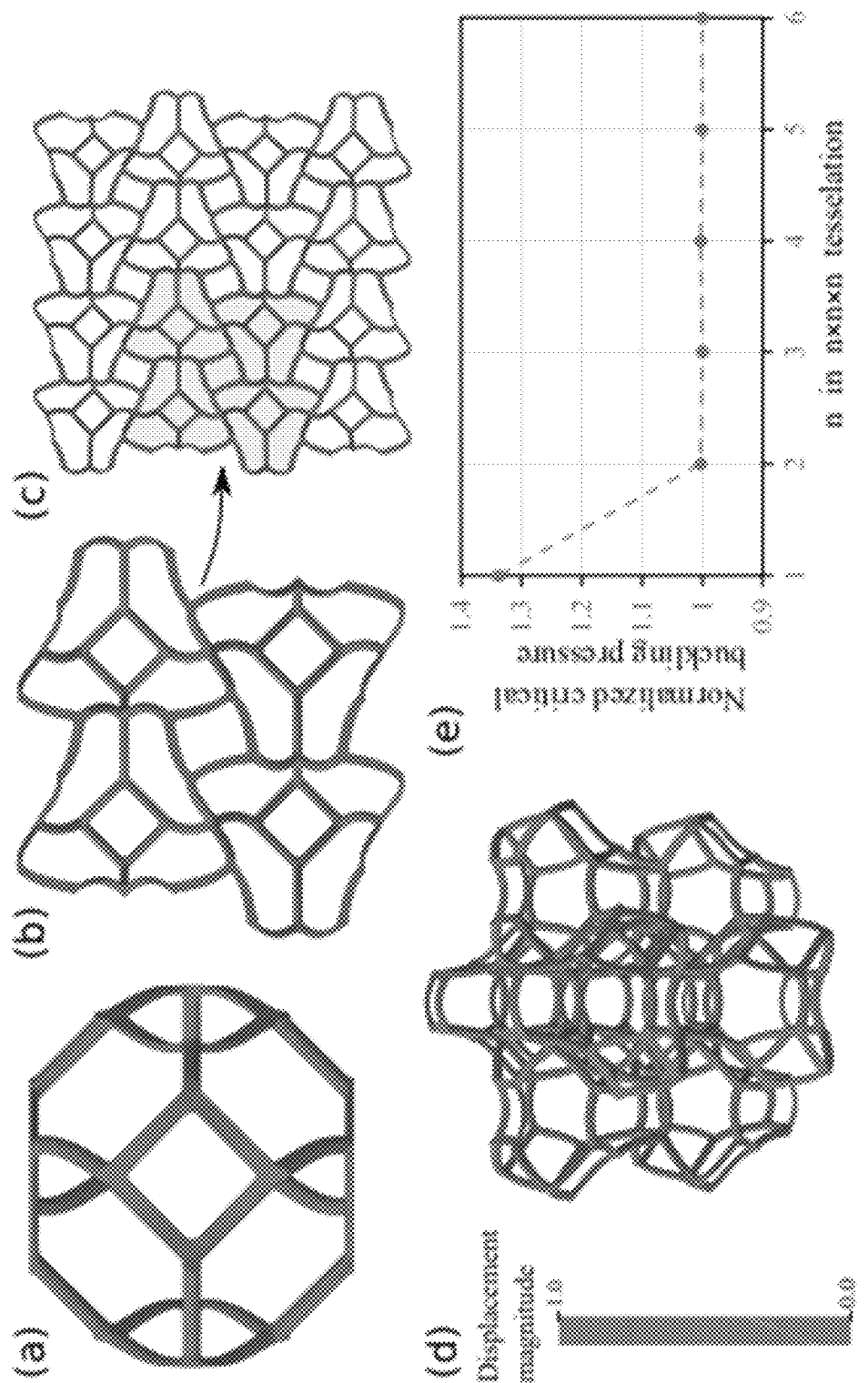
FIG. 5 shows supercell buckling study of a uniform solid cross section BAM with 2% relative density where periodicity of buckling is assumed to occur a domain of n×n×n unit cells; the highlighted region in (c) indicates a domain with identical deformation as observed for n=2; (d) perspective view of the deformed shape on a tessellation with n=2; and (e) convergence of the critical buckling pressure with tessellation size n.

A separate analysis is conducted to evaluate the buckling strength of each BAM design subjected to hydrostatic pressure. The critical buckling strain for pressure loading is calculated with a linear perturbation buckling analysis. Buckling analysis uses a coarser mesh since the same 5% error criterion is used and accuracy of local stress fields is not required. The number of elements in these models ranges from $1\times10^5$ to $2\times10^5$. The critical buckling wavelength was investigated with supercell analysis to ensure that the dominant instability mode was captured while using PBCs. Cubic supercells with n×n×n unit cells, where n=1, 2, 3, 4, 5, 6 were analyzed for various solid and hollow BAM designs within the design window ($0.34\% \geq \bar{\rho} \leq 2\%$). This set of analyses revealed that the critical buckling mode has periodicity longer than that of a single unit cell, and can be captured by a supercell with n=2. FIG. 5 compares the eigenmodes for n=1, 2 and 4. FIG. 5 shows supercell buckling study of a uniform solid cross section BAM with 2% relative density where periodicity of buckling is assumed to occur a domain of n×n×n unit cells. Deformed shapes for (a) n=1, (b) n=2, and (c) n=4 are shown. The yellow highlighted region in (c) indicates a domain with identical deformation as observed for n=2. (d) Perspective view of the deformed shape on a tessellation with n=2. (e) Convergence of the critical buckling pressure with tessellation size n.

The multiple periods of the buckling mode observed in n=4 and agreement in eigenvalues between n=2 and n=4 provides reasonable confidence that using n=2 is suitable to optimize the buckling resistance of the BAM. The newly discovered buckling mode with n=2 has a critical pressure that is noticeably lower than the well-known mode observed for n=1. See, Gong and Kyriakides (2005). It is unclear if the longer wavelength buckling mode identified in the current work was deterred in Gong and Kyriakides (2005) due to the inclusion of anisotropy or if this new mode arises from the compliance at lattice nodes that is captured in the current results by using solid elements rather than beam elements. Calculation of the critical buckling pressure in the current work uses the critical buckling strain from the supercell model with n=2. This strain is multiplied by the bulk modulus from the static analysis to find the critical buckling pressure. Finally, the critical buckling pressure is divided by 9.2 MPa to yield the buckling FS. After performing the static stress analysis and eigenvalue buckling analysis, the FS for each design is taken as the minimum amongst the tensile, shear, and buckling failure modes.

This modeling approach is used to generate baseline cases of BAMs with uniform cross section members that will be used as baseline designs to evaluate the performance of optimized BAMs. Table 1, see FIG. 28, contains the properties of the analyzed baseline cases. The radius and thickness of the hollow cases are chosen to induce simultaneous Euler and shell buckling modes in the struts, see, Timoshenko and Gere (2009) (see FIG. 4), assuming an effective buckling length factor of 1.0. High buckling factor of safeties are found for the hollow baseline designs, however they are paired with poor shear and tensile performance.

This is due to stress concentrations arising from the nodal regions The struts in the hollow baseline cases have thin walls with insufficient material in the nodal regions to transfer the load between struts without creating large stresses. Of greatest consequence is bending deformation of the walls in nodal regions. This generates tensile stresses leading to the low tensile FS. On the other hand, the solid cases perform better in shear and tension, but they are susceptible to buckling. Nonetheless, baseline designs with solid cross sections always outperformed their hollow counterparts by achieving a greater minimum FS. Taken together, these baseline results suggest that optimization can yield improved designs that achieve a balance between the three failure limits.

Geometric Parameterization of Strut Cross-Sectional Geometry

Struts are generated as a body of revolution in this work, and such geometry can be created in various ways. To establish an allowable framework for their construction, struts of arbitrary length L are taken with a maximum allowable radius of the struts $r_{max}$ set to L/6. Additionally, to simplify the forthcoming optimization problem, the current disclosure establishes a link between the geometric parameterization and the anticipated failure modes. This leads us to parameterize variable strut geometry using measures of its cross-sectional area and radius. The cross-sectional area is inversely proportional to the average stress in the strut, while the radius is directly proportional to the Euler-buckling load. To achieve cross sectional area and radius measures that always fall in the interval (0, 1], normalized measures are used. The normalized cross-sectional area $\bar{A}$ is defined as $$\bar{A} = \frac{A}{\pi r_{max}^2} \quad (7)$$

where the real cross-sectional area A is normalized by the maximum allowable cross-sectional area. Struts with solid cross-section are fully defined by a distribution of the normalized cross-sectional area $\bar{A}$, whereas hollow struts also require specification of the normalized radius $\bar{r}$, where $$\bar{r} = \frac{r_o - r_s}{r_{max} - r_s} \quad (8)$$

The normalized radius $\bar{r}$ is constructed such that it takes a value of 0 when the outer strut radius $r_0$ takes the minimum allowable value (corresponding to the solid cross section radius rs) and a value of 1 when it takes the maximum allowable radius $r_{max}$. In accordance, the solid cross section radius $r_s$ is defined by $$r_s = \sqrt{\frac{\bar{A}L^2}{36}} \quad (9)$$

and the outer strut radius $r_0$ is defined by $$r_o = r_s + \bar{r}(r_{max} - r_s) \quad (10)$$

Lastly, the internal radius of a hollow strut rin is given as $$r_i = \sqrt{r_o^2 - \frac{\bar{A}L^2}{36}} \quad (11)$$

Figure 6:
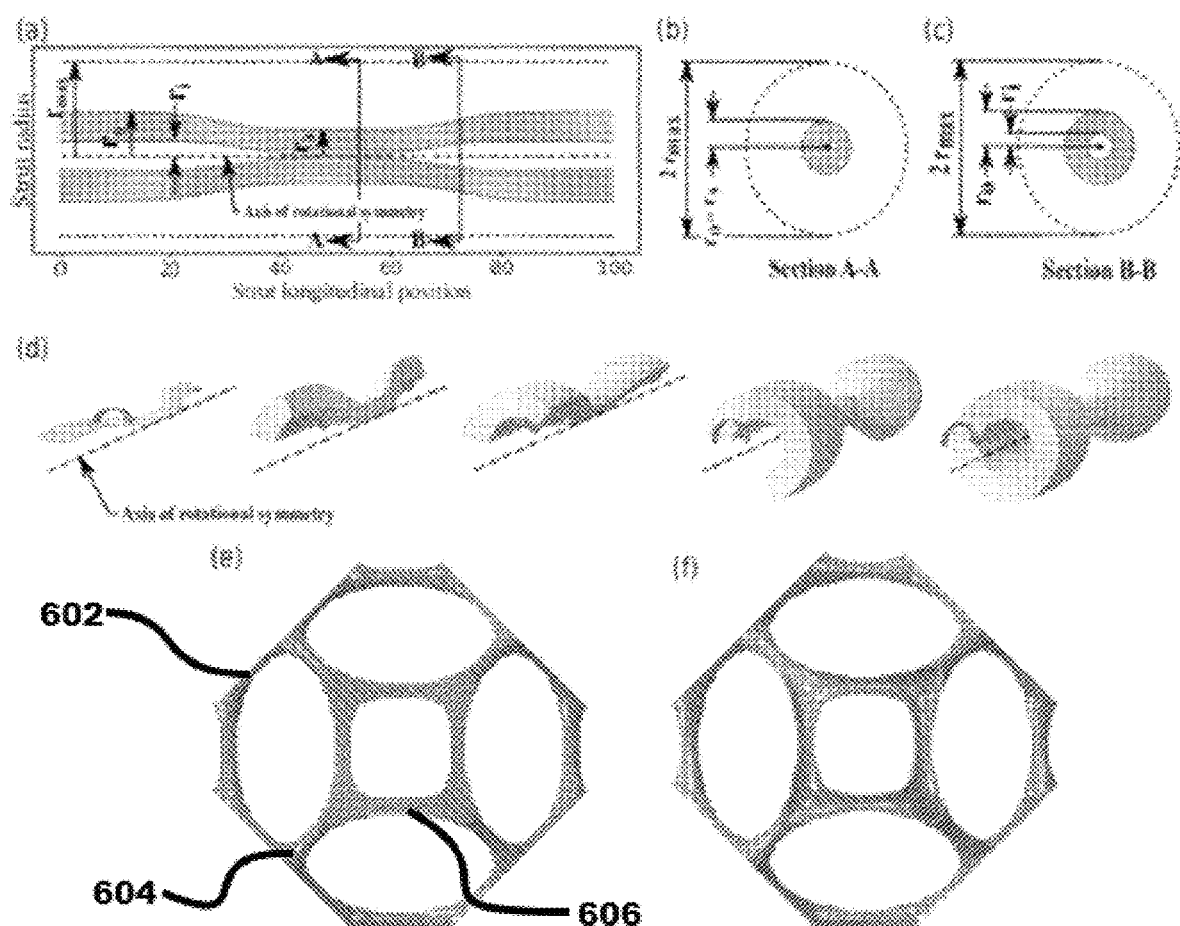
FIG. 6 shows at: (a) arbitrary strut profile constructed using the parameterization used for optimization; (b) section view at a location on the arbitrary strut profile with solid cross section; (c) section view at a location on the arbitrary strut profile with hollow cross section; (d) constructing a three-dimensional (3D) strut from revolution of the profile; (e) capability of the parameterization to construct Kelvin unit cells with an arbitrary complex geometry that has (e) solid cross-section members, and (f) members that are hollow across their entire length.

FIG. 6 shows the general form of a strut created with these formulations. Struts created with this method can be of any aspect ratio $\lambda$ and have arbitrary variable axisymmetric cross-sectional geometry. Cross-sections that are entirely solid, and entirely hollow are possible, as seen in FIG. 6. These axisymmetric struts with complex geometry are then assembled into a Kelvin cells, as shown in FIG. 6 at d and f. FIG. 6 shows: (a) arbitrary strut profile constructed using the parameterization used for optimization; (b) section view at a location on the arbitrary strut profile with solid cross section; (c) section view at a location on the arbitrary strut profile with hollow cross section; (d) constructing a three-dimensional (3D) strut from revolution of the profile; (e) capability of the parameterization to construct Kelvin unit cells with an arbitrary complex geometry that has (e) solid cross-section members; and (f) members that are hollow across their entire length. FIG. 6 also shows ceramic truss strut 602, ceramic node 604, and lattice 606.

Figure 7:
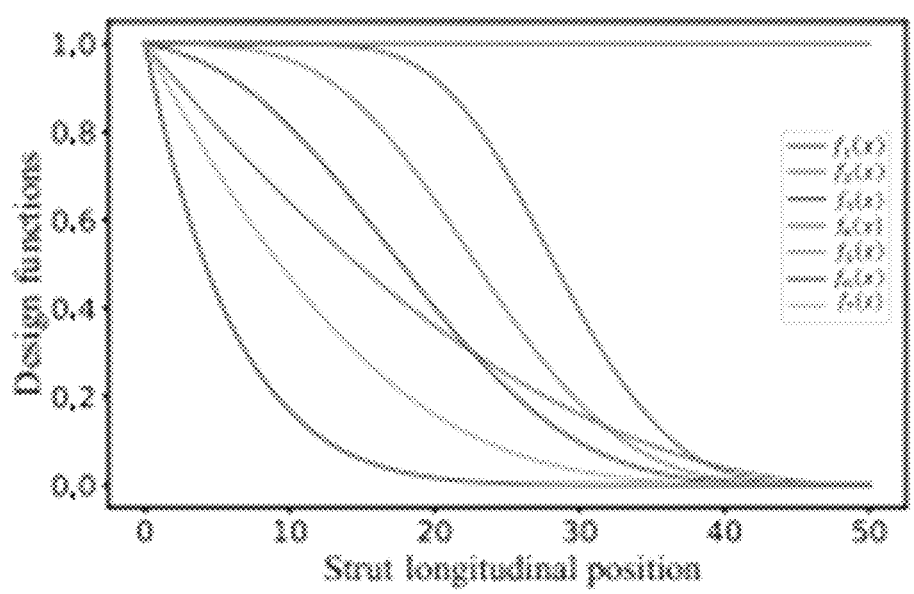
FIG. 7 shows design functions for which linear combinations are used to construct struts with complex geometry.

The variation in normalized cross-sectional area $\bar{A}$ and normalized radius $\bar{R}$ with position x along a strut axis of revolution is accomplished by taking a weighted sum of the seven design functions $f_i$ shown in FIG. 7 according to Eqs. A8 and A9. FIG. 7 shows design functions for which linear combinations are used to construct struts with complex geometry. The individual design functions are also provided in Eqs. A1-A7. These design functions were intuitively selected to enable fine-tuning of the complex stress field in the vicinity of the node during optimization while allowing for diameter variation throughout the entire span of the strut to suppress buckling. This formulation for the strut geometry also ensures smooth variation of the normalized cross sectional area $\bar{A}$ and radius $\bar{r}$ across the strut. In addition to the aforementioned parameters, the fillet parameters at the intersection of struts must be considered to tailor geometry of the BAMs at nodal regions. Solid cross section struts only require an external fillet radius (EFR), while hollow struts require both an EFR and an internal fillet radius (IFR). The filleting radius is normalized by the diameter of the struts at the nodes to form the design variable to be used in the subsequent optimization.

Optimization

This disclosure considers kelvin unit cells with strut cross sections that are solid or fully hollow, as shown in FIGS. 6(e) and 6(f). While solid cross section struts with a partial cavity offer additional design possibilities, manufacturing constraints limit their practical implementation and motivate their exclusion from the design space. Formulas A8 and A9 use 14 design variables to tailor the normalized cross sectional area $\bar{A}$ and radius $\bar{R}$ of the strut, labeled as $w_1$-$w_{14}$. For BAMs with hollow struts, all 14 variables are optimized, while for those with solid struts, only $w_1$-$w_7$ are optimized and all weights associated with $\bar{r}$ are set to zero. In addition, $w_{15}$ (or $w_8$ in the optimization of BAMs with solid struts) and $w_{16}$ are the design variables for the EFR and IFR parameters. The covariance matrix adaptation evolution strategy (CMA-ES), see Hansen, Müller and Koumoutsakos (2003), is selected to optimize the design variables. CMA-ES is a stochastic, derivative-free optimizer which performs well for non-linear problems and rugged objective functions.

Due to these features, CMA-ES has become a widely-used tool in the field of evolutionary computation. The CMA-ES algorithm works by iteratively updating a population of candidate solutions that are sampled from a multivariate normal distribution. The mean vector of the distribution represents the current best estimate of the optimal solution, while the covariance matrix represents the current exploration/exploitation trade off.

CMA-ES algorithm uses an active covariance matrix adaptation selection method to update the mean and covariance matrix of the search distribution. This mechanism considers the relationship between candidate solutions and the search distribution, by computing a weighted average of outer products of difference vectors between candidate solutions and the mean vector. A non-linearly weighted rank based selection method is used to select candidate solutions for producing the next generation. Only a small set of internal optimizer parameters are typically used to initialize CMA-ES; the population size, initial mean, and step size.

Penalties on the objective function are constructed to adjust the optimization search direction and enable optimization at a selected target relative density $\bar{\rho}t$. If the relative density $\bar{\rho}$ is above 4%, the design variables are marked invalid. No modeling and analysis is needed for invalid designs. Instead, a penalty dominated objective function will be calculated based on the FS of a baseline case (presented in Table 1—FIG. 28) and a relative density penalty. The relative density penalty $P^-_\rho$ is calculated based on the difference between $\bar{\rho}$ and the target relative density $\bar{\rho}t$. If $\bar{\rho}t \leq \bar{\rho} < 4\%$, a penalty proportional to the difference between $\bar{\rho}$ and $\bar{\rho}t$ is applied. No penalty is applied when $\bar{\rho} < \bar{\rho}t$. These penalties can be expressed mathematically in Eq. 12.

$$P_{\bar{p}} = \begin{cases} \dfrac{\bar{p} - 0.02}{0.02} & \bar{p} \geq 0.04 \\ \dfrac{\bar{p} - \bar{p}_l}{\bar{p}_l} & \bar{p}_l \leq \bar{p} < 0.04 \\ 0 & \bar{p} < \bar{p}_l \end{cases} \quad (12)$$

Another constraint ensures that the normalized cross sectional area $A^-$ and normalized radius $\bar{r}$ distributions fall within the valid range of [0, 1]. The combination of design variables is marked invalid if $A^-(x)$ or $R^-(x)$ values fall below zero or exceed one at any point along the length of a strut. In this case, a penalty dominated objective function will be calculated and be penalized based on the violation of constructing parameters validity limits ([0, 1]) of the strut. $P_{A-}$, and $P^-_r$ are the penalties correspond to the violation of these limits and are calculated using Eqs. 13-14. Note that the penalty $P^-_r$ does not apply for solid cross-section struts since $\bar{r}=0$ in this case.

$$P_{\bar{A}} = \begin{cases} \max(\bar{A}(x) - 1) & \bar{A}(x) > 1 \\ \max(|\bar{A}(x)|) & \bar{A}(x) < 0 \end{cases} \quad (13)$$

$$P_{\bar{R}} = \begin{cases} \max(\bar{R}(x) - 1) & \bar{R}(x) > 1 \\ \max(|\bar{R}(x)|) & \bar{R}(x) < 0 \end{cases} \quad (14)$$

Implementation of CMA-ES is conducted using the pycma python package, see Hansen, Akimoto and Baudis (2019). The internal optimizer parameters of population size and standard deviation are selected to pursue the global minimum. A population size of 80 is used, and the mean of the distributions in the first generation were selected to correspond to the best known solution. In some optimization runs, the best known solution was the baseline case of uniform struts (solid or hollow), while other cases built on the results of an initial optimization run. In this initial optimization, the objective function is the ratio of relative density $\bar{\rho}$ to FS. This eliminates the need for the target relative density $\bar{\rho}t$ and enables the optimizer to identify numerous designs across a range of relative densities that outperform the baseline designs. The mean of the first generation distribution is based on the design variables of the baseline case with the relative density of $\bar{\rho}=1.5\%$. As the adaptation process continues, the mean evolves towards lower relative densities, resulting in improved designs covering a significant portion of relative density ranges within the design space. Use of this information for the start point in subsequent optimization runs with a target relative density $\bar{\rho}t$ decreases the number of generations required for convergence. The optimization with $\bar{\rho}t$ constraint are conducted for target relative densities of 1%, 1.5%, and 2% for BAMs with hollow and solid cross section struts. In these constrained optimization runs the objective function is taken to be the inverse of factor of safety $$\left(\frac{1}{FS}\right).$$

Figure 8:
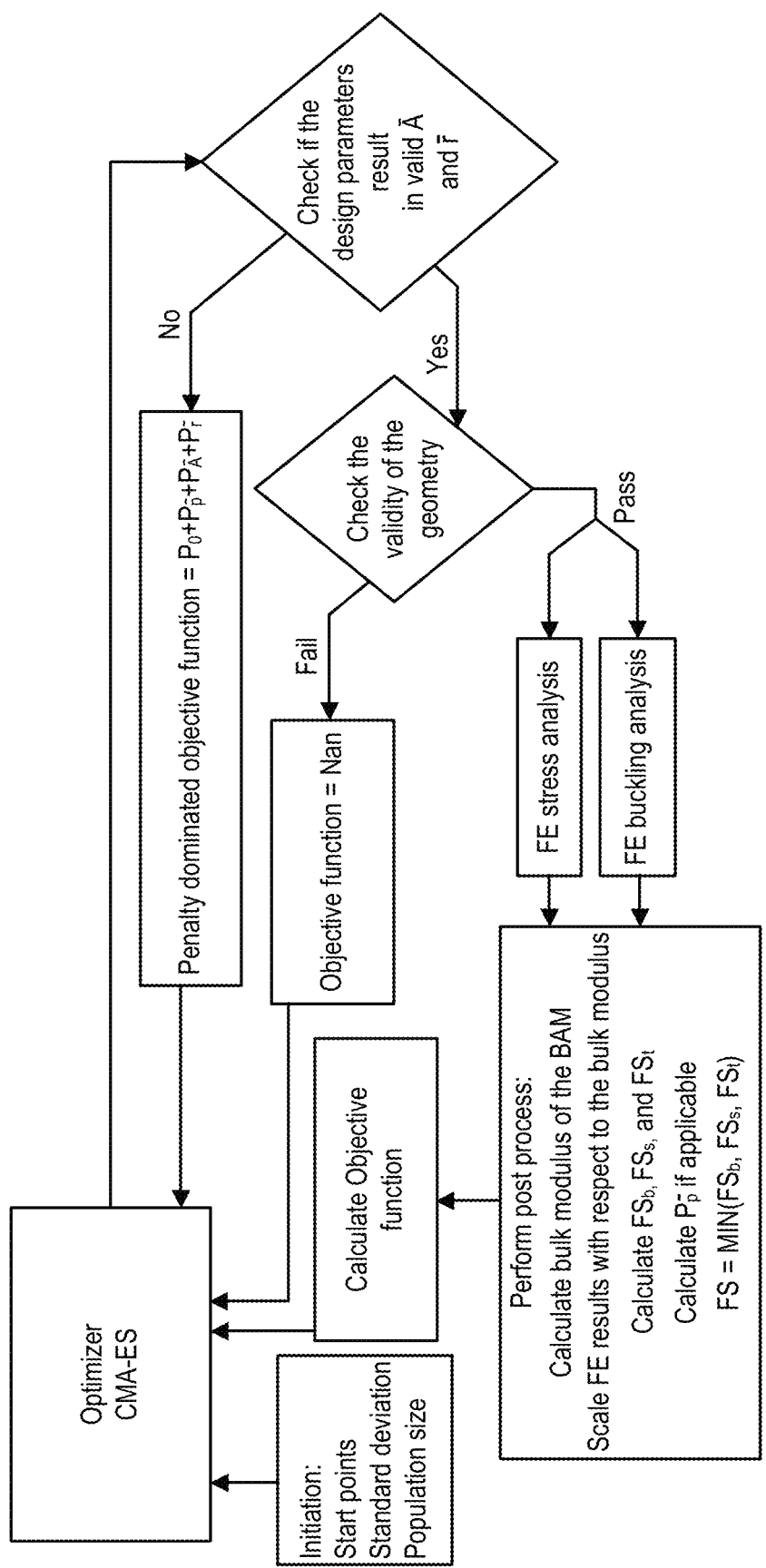
FIG. 8 shows a computational algorithm for geometric optimization of BAMs.

The computational platform used to optimize BAM geometry is summarized in the flowchart shown in FIG. 8. FIG. 8 shows a computational algorithm for geometric optimization of BAMs. The optimization process begins by specifying the initial means and standard deviations of design variable distributions, as well as the population size. The optimizer samples the distributions to make sets of design variables and sends them to the verification step, where the normalized cross sectional area $A^-$, normalized radius $\bar{r}$ are checked for validity, and the relative density is compared to the target value for cases where the relative density constraint is enforced. If the set violates any of these criteria, a low-cost, penalty dominated objective function value is returned. Valid sets are submitted for finite element modeling, and if they fail to produce a meaningful physical model within the kelvin unit cell family, no objective function value is returned. After the initial generations, most candidate designs are successful. These models undergo static and buckling analysis, with post-processing used to obtain shear, tensile, and buckling FS for each design. The objective function value is calculated using the model output and returned to the optimizer. The optimizer adapts step size, search direction, and sampling based on the objective function values. In this work, the optimization continues until convergence of the objective function and the parameters of the multivariate distribution are apparent. Negligible improvement of the objective function, and falling of the standard deviations below 0.01 are used as the convergence criteria in this work.

Results and Discussion

Figure 9:
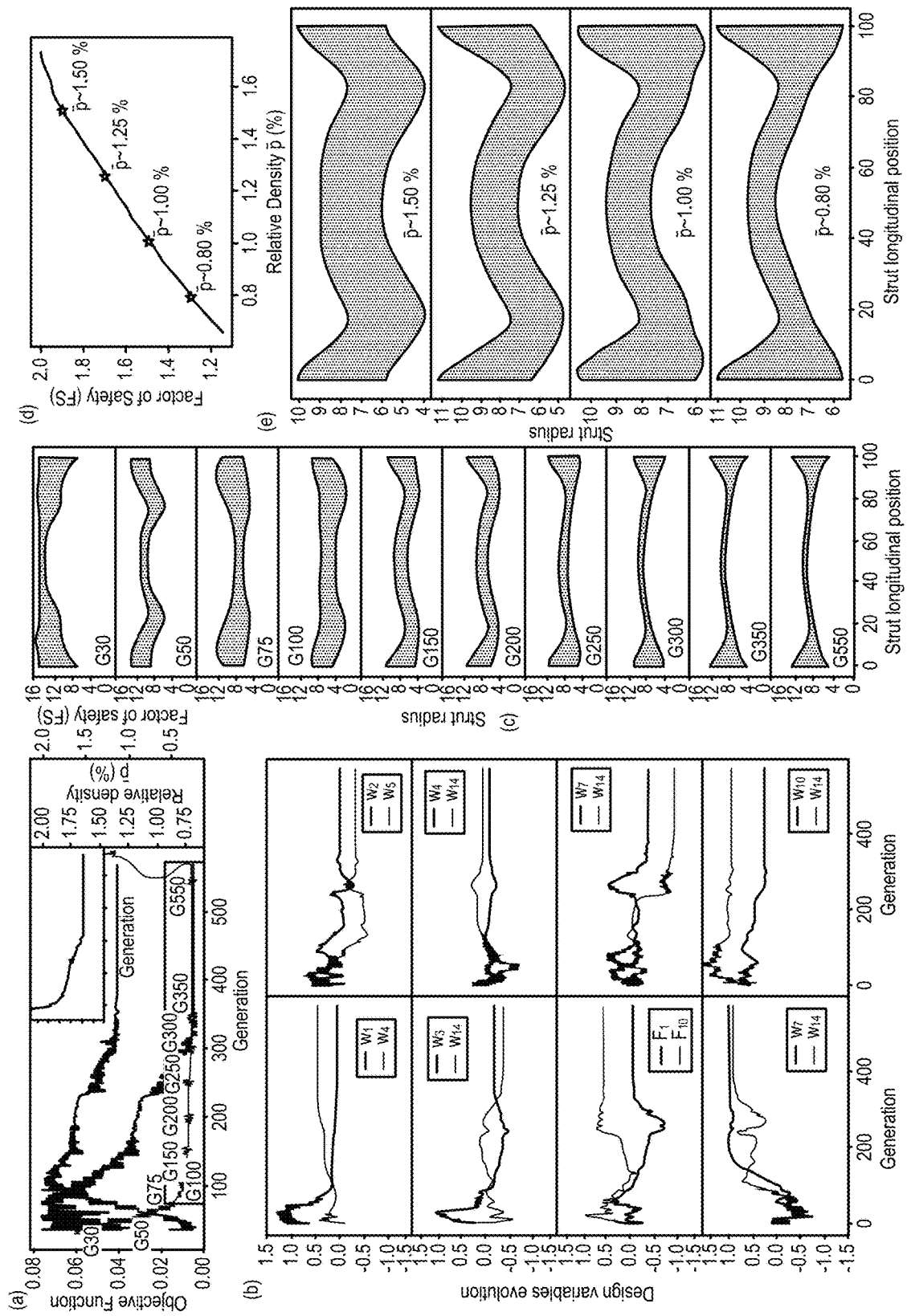
FIG. 9 shows optimization results for hollow struts with objective function $$\frac{1}{FS};$$

Optimization has been conducted using the computational platform described in the preceding section. FIG. 9 illustrates the results from an optimization run with unconstrained relative density for BAMs with hollow struts. FIG. 9 at a shows the evolution of the relative density $\bar{\rho}$, FS, and their ratio (which is used as the objective function). It can be seen that the rapid decrease in the ratio $$\frac{\bar{p}}{FS}$$

in the first 100 generations is accomplished by an increase in the FS with relatively constant relative density $\bar{\rho}$. Afterward, the ratio $$\frac{\bar{\rho}}{FS}$$

decreases more modestly, however, both the relative density $\bar{\rho}$ and FS decrease with further generations. All quantities converge around 350 generations, and further optimization yields no change in the geometry. This convergence trend can also be seen in the evolution of mean and standard deviation of the adapted normal distribution for the design variables as shown in FIG. 9 at b. FIG. 9 at c illustrates the evolution of the strut profile toward the optimum geometry (in the illustrations of the strut profiles in this disclosure, e.g., FIG. 9 at c and e, filleting and effect of struts overlapping at the nodal regions are not depicted). This optimization run converged to a relative density of $\bar{\rho}$=0.65%, which suggests that there is an inherent benefit at this relative density. Also, this optimization provides FS for prominent candidate solutions across a range of relative densities. The designs with the best FS are shown in FIG. 9 at d and e. FIG. 9 shows optimization results for hollow struts with objective function $$= \frac{\bar{\rho}}{FS}:$$

(a) evolution of key performance measures; (b) evolution of the design variables; (c) evolution of strut cross-sectional geometry; (d) FS and bulk modulus from the highest performing candidate designs at different relative densities; and (e) strut profiles for the models with highest FS at 0.8%, 1.0%, 1.25%, and 1.5% relative densities.

The large range of BAM designs identified at various feasible FS values strongly suggests that BAMs with hollow struts can be designed to operate on Venus while providing substantial buoyancy. In order to optimize hollow BAMs at a target relative density $\bar{\rho}_t$, the highest performing designs from the unconstrained optimization are used as starting points. For BAMs with solid cross section struts, the base cases with uniform strut geometry are used as the starting points for optimization. Evolution of the objective function, FS and relative density $\bar{\rho}$ for the constrained optimization runs can be found in FIG. 20. FIG. 20 shows optimization results: (a) hollow strut unit cell with $\bar{\rho}$=1.0% target relative density; (b) Hollow strut unit cell with $\bar{\rho}$=1.5% target relative density; (c) solid strut unit cell with $\bar{\rho}$=2.0% target relative density.

Table 2, see FIG. 29, summarizes the performance of the optimized BAMs at different relative densities $\bar{\rho}$ within the buoyancy range. Considering that the maximum lifting capacity of BAMs cannot exceed 65 kg/m$^3$, these optimized designs can operate on Venus while providing substantial buoyancy at low relative density $\bar{\rho}$. For example, the optimized SiC BAM with a relative density of $\bar{\rho}$=0.65% can generate 44 kg of lift for every cubic meter of atmosphere that it displaces.

The current disclosure begins discussion with the results for solid cross section struts. Optimization results for a $\bar{\rho}$=2% relative density design (see FIGS. 26 and 27) demonstrate an improvement in FS of 5%. FIG. 27 shows stress analysis results for the optimized geometry with solid cross section struts and $\bar{\rho}$=2.00% relative density: (a) maximum principal stress field. Stresses on the free surfaces are computed from the membrane elements; (b) tensile FS field. FS on the free surfaces are computed from the membrane elements; (c) tensile FS in the shell cover; (d) shear stress field; (e) shear strength determined from the local pressure stress fields and EMC model; and (f) shear FS field. The insignificant improvement over the baseline case and geometric similarity between the designs indicates that the design space of solid cross-sectional geometry limits the potential for enhancing the performance of BAMs. Analysis of the local stress fields from FEM results of the $\bar{\rho}$=2% relative density BAM with solid cross-section struts reveals a significant improvement in managing tensile stresses compared to the hollow cases. However, the susceptibility to buckling of BAMs with solid cross-section struts could not be addressed by shape optimization, and always hampered their performance (see Table 2—FIG. 29). The optimization results for BAMs with solid cross-section struts at lower relative densities $\bar{\rho}$ further supports this interpretation, as a severe reduction in buckling FS is observed when the relative density $\bar{\rho}$ decreases.

The results for hollow cross section struts proves far more consequential. Comparing the performance to the baseline cases, the optimized hollow designs are found to vastly outperform the baseline cases. These improvements are particularly noticeable at lower relative densities $\bar{\rho}$, with the optimized case at relative density $\bar{\rho}$=0.65% showing nearly a five-fold improvement over the baseline case with similar relative density $\bar{\rho}$. An interesting aspect of the optimized hollow BAMs with $\bar{\rho}$=0.65%, 1%, and 1.5% relative density is that the optimizer converges to designs with the ideal trade-off between different failure modes, with all failure modes happening simultaneously for these cases. The optimized design variables for each of these models can be found in Tables A1, see FIG. 31 and Table A2, see FIG. 32.

The strength scaling relationship in Eq. 15 is identified as the best fit to the simulation results presented in Table 2—FIG. 29. In this expression, 1.82 GPa represents the compressive strength of SiC in the absence of pressure stress. This novel strength scaling relationship can be compared to the scaling relation developed in Eq. 4, considering both the absence and presence of Venus atmospheric pressure. For ease of comparison, the current disclosure can approximate the scaling relation in Eq. 4 as a single term scaling relation within buoyancy ranges of relative densities for SiC material, as illustrated in Eq. 16. FIG. 10 displays the scaling relationships from Eqs. 4, 16, and 15. It is apparent that the optimization results are in the vicinity of the theoretical strength achievable in a SiC lattice. The increased strength of the optimization results over the linear scaling relation shown in FIG. 10 arises from the pressure sensitive shear strength of the parent material. FIG. 10 shows SiC BAMs strength scaling relation and its comparison with scaling relation limits for stretching dominated truss lattice material. Due to the nature of the exclusively traction boundary conditions, the average pressure present in the solid is inversely proportional to the relative density of the material. Thus, lower relative density lattices are effectively constructed of a stronger parent material than higher density lattices of the same composition. Notably, the scaling exponent of 0.62 fit to the simulation data is far more favorable than the ideal scaling of stretching dominated lattices, see Gibson and Ashby (1999), with the conventional scaling exponent of 1.0, when the pressure stress sensitive strength of SiC is neglected.

$$\sigma_f^{BAM}(GPa) = 0.134 \cdot 1.82 \cdot \rho^{-0.62} \qquad (15)$$

$$\sigma_f^{fit}(GPa) = 0.08 \cdot 1.82 \cdot \overline{\rho}^{0.49} \quad 0.34 \leq \overline{\rho}(\%) \leq 2.0 \qquad (16)$$

To gain a comprehensive understanding of the mechanical properties of the optimized BAMs, it is imperative to conduct further investigations into their geometric characteristics and detailed results from stress and buckling analysis. FIG. 11 provides the details on the strut profile, normalized cross-sectional area $\overline{A}$ and normalized radius $\overline{r}$ distributions, and an illustration of the nodal geometry for the optimized hollow BAM design with relative density $\overline{\rho}=0.65\%$. FIG. 11 shows geometric details of the $\overline{\rho}=0.65\%$ optimized unit cell geometry with hollow struts obtained by minimizing $$-\frac{\overline{p}}{FS}:$$

(a) profile of the revolved section used to generate the struts; (b) optimal normalized cross-sectional area $\overline{A}$ along the length of the struts; (c) optimal normalized radius $\overline{r}$ along the length of the struts; (d) Kelvin unit cell with optimized geometry; (e) cross-sectional view highlighting a single strut and nodal geometry. FIG. 12 provides field quantities related to the failure modes of the optimum model with $\overline{\rho}=0.65\%$ relative density. FIGS. 12a and b show the maximum principal stresses and corresponding tensile-FS distribution from the membrane elements on the surface of this BAM. FIG. 12 shows stress analysis results for the optimized geometry with $\overline{\rho}=0.65\%$ relative density when loaded by the atmospheric pressure at the surface of Venus: (a) maximum principal stress field. Stresses on the free surfaces are computed from the membrane elements; (b) tensile FS field. FS on the free surfaces are computed from the membrane elements; (c) critical eigen mode from buckling analysis of the 2×2×2 tessellation of the optimized geometry; (d) shear stress field; (e) shear strength determined from the local pressure stress fields and EMC model; (f) Shear FS field. The max principal stresses act in the hoop direction (see FIG. 21 at h) across the entire free-span of the struts with a nearly uniform distribution. FIG. 21 shows a comparison of the stress analysis results for the optimized geometry and its counterpart hollow base case for relative density $\overline{\rho}=1.0\%$: (a) minimum principal stress field for the base case; (b) minimum principal stress distribution and direction within a strut span for the base case; (c) maximum principal stress field for the base case; (d) maximum principal stress distribution and direction within a strut span for the base case; (e) minimum principal stress field for the optimized geometry; (f) minimum principal stress distribution and direction within a strut span for the optimized geometry; (g) maximum principal stress field for the optimized geometry; and (h) maximum principal stress distribution and direction within a strut span for the optimized geometry. A critical result of the optimization is that nearly the entire nodal region has a compressive maximum principal stress. This is in stark contrast to what occurs in hollow thin-walled base cases, where high tensile stresses are encountered in the nodal regions. FIG. 13 shows geometric details of the $\overline{\rho}=1.00\%$ optimized unit cell geometry with hollow struts obtained by minimizing $$\frac{1}{FS}:$$

(a) profile of the revolved section used to generate the struts; (b) optimal normalized cross-sectional area $\overline{A}$ along the length of the struts; (c) optimal normalized radius $\overline{r}$ along the length of the struts; (d) Kelvin unit cell with optimized geometry; (e) cross-sectional view highlighting a single strut and nodal geometry. FIG. 14 shows stress analysis results for the optimized geometry with $\overline{\rho}=1.00\%$ relative density: (a) Maximum principal stress field. Stresses on the free surfaces are computed from the membrane elements; (b) Tensile FS field. FS on the free surfaces are computed from the membrane elements; (c) critical eigen mode from buckling analysis of the 2×2×2 tessellation of the optimized geometry; (d) shear stress field; (e) shear strength determined from the local pressure stress fields and EMC model; and (f) shear FS field. FIG. 22 shows geometric details of the $\overline{\rho}=1.50\%$ optimized unit cell geometry with hollow struts obtained by minimizing $$\frac{1}{FS}:$$

(a) profile of the revolved section used to generate the struts; (b) optimal normalized cross-sectional area $\overline{A}$ along the length of the struts; (c) optimal normalized radius $\overline{r}$ along the length of the struts; (d) Kelvin unit cell with optimized geometry; and (e) cross-sectional view highlighting a single strut and nodal geometry. FIG. 23 shows stress analysis results for the optimized geometry with $\overline{\rho}=1.50\%$ relative density: (a) maximum principal stress field. Stresses on the free surfaces are computed from the membrane elements; (b) tensile FS field. FS on the free surfaces are computed from the membrane elements; (c) critical eigen mode from buckling analysis of the 2×2×2 tessellation of the optimized geometry; (d) shear stress field; (e) shear strength determined from the local pressure stress fields and EMC model; and (f) shear FS field. FIG. 24 shows geometric details of the $\overline{\rho}=2.00\%$ optimized unit cell geometry with hollow struts obtained by minimizing $$\frac{1}{FS}:$$

(a) profile of the revolved section used to generate the struts; (b) optimal normalized cross-sectional area $\overline{A}$ along the length of the struts; (c) optimal normalized radius $\overline{r}$ along the length of the struts; (d) Kelvin unit cell with optimized geometry; and (e) cross-sectional view highlighting a single strut and nodal geometry.

The current disclosure further expands on the discussion with analysis of optimized designs at higher relative densities. Details on the strut profile, normalized cross-sectional area $\overline{A}$ and normalized radius $\overline{r}$ distributions, and an illustration of the nodal geometry of these cases can be found in FIGS. 13, 22, and 23. Also, the corresponding FEM results of each optimized design is presented in FIGS. 14, 23, and 25. It is evident that the optimized geometry of the BAMs at high relative densities (e.g., $\overline{\rho}=1.5\%$ and 2%) exhibit a more uniform material and thickness distribution in both the strut walls and nodal regions, when compared to the optimal cases at lower relative densities (e.g., $\overline{\rho}=0.65\%$ and $\bar{\rho}$=1%). In addition, non-symmetric distribution of tensile FS in circumferential direction of the struts reveals the fact that the BAMs experience stretching dominated behavior with a non-negligible bending component. Furthermore, as the relative density increases, the tensile regions in the free span of the struts gradually evolve to a compressive stress state. This phenomenon is particularly evident in the optimal case with a relative density of $\bar{\rho}$=2%, revealing that tensile stresses only appear in certain local circumferential regions along the length of the struts, while the majority of the material within the unit cell experiences compression.

In addition to tensile rupture, the shear performance of the optimized models are analyzed. Material shear strength, as well as the shear factor of safety (FS) distributions within the solid body of the optimized unit cells, are depicted in the FEM results FIGS. 12, 14, 23, 25, and 27, parts d-f. For optimized hollow BAMs with relative densities $\bar{\rho}$=1.5% and $\bar{\rho}$=2.0%, the maximum stress occurs where struts meet nodal regions (see FIGS. 23 and 25). For optimized hollow BAMs with relative densities $\bar{\rho}$=0.65% and $\bar{\rho}$=1.0% the maximum stress occurs in the nodal regions (see FIGS. 12, 14). The pressure stress, and thus the shear strength, always reaches a maximum value in the nodal region. FIG. 25 shows stress analysis results for the optimized geometry with $\bar{\rho}$=2.00% relative density: (a) maximum principal stress field. Stresses on the free surfaces are computed from the membrane elements; (b) tensile FS field. FS on the free surfaces are computed from the membrane elements; (c) critical eigen mode from buckling analysis of the 2×2×2 tessellation of the optimized geometry; (d) Shear stress field; (e) Shear strength determined from the local pressure stress fields and EMC model; and (f) Shear FS field.

It is observed that geometric optimization is able to colocate the unavoidable shear stress concentrations in the nodal regions with high pressure stress to achieve extraordinary strength at low relative density. The material in these regions exhibits higher shear strength in comparison to most other regions in the lattice with lower pressure stress. Coupling between the parent material properties and the geometric optimization is found to be essential to achieve these results. Neglecting the confinement effect would lead to an underestimate of the strength and almost certainly lead the optimizer to different designs.

Interestingly, the optimized hollow cases always have a higher shear FS than the optimized solid cross-section cases at the same relative density. This can be attributed to the differences in the nodal regions of the BAMs with solid and hollow struts. The nodal regions of BAMs with solid struts have a relatively large pressure stress acting throughout their entire volume, whereas the shear stress is only substantial near their free surface as shown in FIG. 27 at d and f. The current disclosure notes that the total amount of pressure stress in the lattice is determined by the loading and is invariant across all designs of the same relative density. Thus, these interior regions of solid BAMs with high pressure necessarily deprive other regions where the pressure would be beneficial to increase the shear strength. Consequently, the solid BAMs fail to elicit the pressure strengthening effect of the parent material as effectively as their hollow counterparts. The optimized hollow BAMs compare well to all other cases and warrant further quantification of their performance.

Through the field quantities related to the failure modes for the optimum cases, the current disclosure can evaluate the effectiveness of designs in harnessing the inherent properties of the parent material. This evaluation involves comparing the performance of designs with respect to the theoretical limits of the parent materials, as illustrated in FIG. 15. FIG. 15 shows the efficiency of optimized designs in utilizing the capacity of parent material is shown, where lower relative densities approach the theoretical limit of the material but have decreased FS. The distribution of shear stress-pressure-stress in the elements of the BAMs strut body is represented by the shaded area. The average mix of shear stress and pressure-stress for an axial strut within the BAMs is depicted by the solid point in the center of each distribution. The shaded regions in this figure represent the distribution of shear strength/pressure-stress at points in the free-span of struts in the BAM designs. The solid point in the middle of each distribution depicts the mean of the shear-strength/pressure-stress distribution. The figure clearly demonstrates that BAMs with lower relative densities effectively push the parent material towards states of higher pressure-stress and shear strength. These lower density designs achieve closer proximity to theoretical strength limit. The least dense optimized design at $\bar{\rho}$=0.65% achieves 62.5% of the theoretical strength, whereas the solid baseline design at $\bar{\rho}$=2% relative density achieved just 16.3% of the theoretical strength. The relative improvement of the optimized design over the baseline is so substantial that most of the theoretically possible improvement has been realized by the geometric optimization detailed here.

The final failure mode to be discussed is the buckling of the optimized BAMs. In comparison to the hollow baseline cases, the optimized hollow cases trade excess buckling capacity to increase shear and tensile FS. This is accomplished in an ideal manner, resulting in all three failure modes having equivalent FS values. Physically, this is achieved by using a smaller normalized cross sectional radius $\bar{r}$ throughout the struts so that more material is available to manage stresses in the nodal regions. In contrast to the high buckling capacity of the hollow designs, solid strut designs mainly experience buckling failure, with only BAMs of specific relative densities $\bar{\rho}$ near neutral buoyancy ensuring reliable buckling FS under Venus atmospheric pressure.

The final mechanical characterization is on the imperfection sensitivity of the optimized BAM designs that are found to be feasible. Static analysis, including the effect of non-linear geometry, on the optimized BAM designs with geometric imperfection corresponding to the critical buckling mode is conducted. The shear and tensile factors of safety have been computed for 13 different imperfection amplitudes, up to 5% of the strut length. The results of this sensitivity analysis are shown in FIG. 16. FIG. 16 shows sensitivity analysis of the optimized models due to geometrical imperfections, correspond to the first buckling eigen mode.

Although, both failure limits are sensitive to the geometric imperfections, the shear FS is only weakly affected by imperfections and remains above 1 over the range of imperfection amplitudes considered. The tensile factor of safety exhibits greater imperfection sensitivity and a greater variety of behavior between designs. In the absence of imperfections, the solid cross-section design has substantially higher tensile FS than the hollow designs, however, it also has far greater imperfection sensitivity. As a result, the solid cross-section designs yields a lower tensile factor of safety than most hollow cases at imperfection amplitudes in the range of 2-3% of the strut length. The only optimized hollow BAM design with lower tensile FS than the solid cross section over this range of imperfections is that with relative density $\bar{\rho}$=0.65%. The BAM with relative density $\bar{\rho}$=1% maintains tensile FS above 1 for imperfections up to 3% of the strut length. The optimized hollow struts BAMs with $\bar{\rho}=1.5\%$ and $\bar{\rho}=2\%$ relative densities retain tensile factors of safety greater than one for the range of imperfections considered.

The mechanical feasibility of BAMs to support the atmospheric pressure on Venus has been demonstrated, so the current disclosure now turns to characterize the benefit these materials offer as structural thermal insulation for vacuum airships. Calculation of the thermal conductivity for the optimized BAM designs was conducted using finite element analysis. The same FE models used for stress analysis were now subjected to a periodic thermal gradient, and the thermal flux through the unit cell was computed. Due to cubic symmetry, the thermal conductivity is isotropic. A thermal flux was applied across all periodic directions to provide three independent measurements of the thermal conductivity, which were found to have negligible difference. FIG. 17 illustrates the temperature field and heat flux in two of the optimized BAMs. FIG. 17 shows Nodal temperature and heat flux (HFL) of the optimized model under temperature gradient: (a) optimized hollow model with relative density $\bar{\rho}=0.65\%$ under equal temperature gradient in all periodicity directions; (b) optimized solid model with relative density $\bar{\rho}=2.0\%$ under temperature gradient in one periodicity directions; (c) corresponding (HFL) for the hollow model under the applied temperature gradients; (d) corresponding (HFL) for the solid model under the applied temperature gradient. Table 3, see FIG. 30, represents the thermal conductivity of the SiC BAMs, demonstrating a significant advantage over traditional lifting gases. Unlike the strength, the geometric details of the optimized designs did not have a significant impact on the thermal conductivity. The thermal conductivity of the optimized designs is well approximated with Eq. 17, where K is the thermal conductivity of the parent material Kumar and Topin (2014). K $$K_{cond} = \frac{\bar{\rho}}{3} \cdot K \tag{17}$$

In addition to the evaluation of thermal conductivity $K_{cond}$, the radiative heat transfer $K_{rad}$ of BAMs is estimated using the analytical formulation proposed for the Kelvin unit cells in Eq. A10, see Coquard et al. (2012). During the use of this equation, geometrical details of the BAMs, such as hollowness, variation in cross-sectional area, and radius, are assumed to have a minimal impact on radiative transfer compared to the BAM porosity and cell size, which have a more significant influence, as studied by Li, Xia, Sun, Zhang and Tan (2019). Consequently, such geometrical details are neglected. Furthermore, the porosity of hollow BAMs is evaluated while disregarding the hollowness of the struts.

FIG. 18 at a illustrates the radiative thermal conductivity $K_{rad}$ of the Kelvin unit cell for different ranges of relative densities $\bar{\rho}$ and unit cell size ($D_{cell}$) at Venus temperature. This figure indicates that at high temperatures, radiation is the primary mechanism of heat transfer, and conductivity has negligible effects. This observation is consistent with the results of experimental studies conducted on SiC Kelvin foam to investigate the characterization of coupled radiative and conductive heat transfer, see Sans et al. (2020). With the assumption that the hollowness of the designs can be neglected, the relative densities $\bar{\rho}$ of the optimized hollow BAMs are effectively in the range of $\bar{\rho}=2.4\%$-$2.8\%$ in FIG. 18 at a. Additionally, FIG. 18 at b depicts the combined effect of heat conduction and radiation ($K_{cond}+K_{rad}$) on the thermal, $K_{eff}$ of BAMs with different unit cell sizes. FIG. 18 shows at: (a) radiative thermal conductivity $K_{rad}$ of SiC Kelvin lattice for different relative densities $\bar{\rho}$ and unit cell sizes; (b) effective thermal conductivity $K_{eff}$ of the optimized BAM designs including heat conduction and radiation effect as a function of unit cell size $D_{cell}$; (c) effective thermal conductivity $K_{eff}$ of the optimized BAM designs with Au coating including heat conduction and radiation effect as a function of unit cell size $D_{cell}$; (d) thermal conductivity of Helium $K_{He}$, under Venusian atmospheric conditions, as a function of diameters of concentric spheres. $D_o$ and $D_i$ denote the diameter of the external and internal spheres, respectively.

This figure shows the large effect of unit cell size on the thermal conductivity of BAMs. Although it radiative transport plays a dominant role in thermal transport, application of a low emissivity coating like gold (Au) can substantially reduce radiative heat transfer. The thermal radiation of the BAMs with Au coating can be approximated using Eq. 18. See, Barea, Osendi, Ferreira and Miranzo (2005). In this equation sigma represents StefanBoltzman constant, T represents the ambient temperature, $\epsilon$, n, and d denote the emissivity, the refractive index, and pore size respectively. Assuming emissivity $\epsilon$, and refractive index of 0.03 (unoxidized Au) and 1.88 (with peak wavelength of 3.931 μm at Venus temperate) for Au, the effective thermal conductivity $K_{eff}$ of BAMs with Au coating is illustrated in FIG. 18 at c. It can be seen that applying the coating reduces the radiation effect noticeably, and result in BAMs with low thermal conductivity.

$$K_{rad} = 4\sigma\epsilon n^2 dT^3 \tag{18}$$

To demonstrate the thermal isolation advantage of BAMs, a comparison is needed against traditional lifting gases. The current disclosure assumes an instrument cabinet refrigerated to 20° C. is located at the center of a spherical balloon whose external temperature is equal to the ambient 464° C. found on the surface of Venus. In that case, the surrounding medium (gas or BAM) provides some thermal insulation. Considering the effective thermal conductivity between concentric spheres, the empirical relation in Eq. A11 is applicable when using a lifting gas. See, Raithby and Hollands (1975). By choosing helium as the lifting gas and using Eq. A11, FIG. 18 at c shows the thermal conductivity of helium $K_{He}$ for different ranges of spheres diameters ($D_o$ and $D_i$ denote the diameter of external and internal spheres). It is observed that no value on this map of effective thermal conductivities comes near to the values obtained by the Au coated SiC BAM. The more than ten-fold decrease in conductivity offered by the BAM vastly reduces the cooling needs and may prove decisive in making a future missions to Venus with a refrigerated mobile science package possible.

CONCLUSION

Evidence supporting the feasibility of a vacuum airship for near-surface flight on Venus has been developed. The approach investigated the use of architected materials in place of conventional lifting gases to support a thin envelope. SiC Kelvin cells with optimized strut geometry having densities between 20.86 and 64.2 kg/m3 are detailed with the required physical and mechanical properties to enable a vacuum airship to operate in the Venusian atmosphere, where pressures reach 9.2 MPa. The primary advances made to achieve this outcome are as follows:

- A new Gibson-Ashby type strength scaling relationship was developed. Simply incorporating the pressure sensitive shear strength of ceramic materials gives rise to better than linear scaling (i.e., scaling exponents substantially less than one).
- A new theoretical limit for stretching dominated beam based architected materials is established by considering when the linear shear-pressure relationship for uniaxial loading intersects a nonlinear Mohr-Coulomb type failure envelope of a ceramic parent material.
- Geometric optimization of an open cell Kelvin foam sufficiently guarded against tensile and buckling failure modes to demonstrate better than linear strength scaling in a fully defined material design.
- A new buckling mode with lower critical pressure and longer wavelength has been identified for open-cell Kelvin foams subjected to hydrostatic loading.
- Analysis of optimized hollow designs with geometric imperfections shows that at relative densities $\bar{\Sigma} \geq 1\%$, sufficient safety margins exist to operate at atmospheric pressures found on Venus.
- The thermal conductivity ($K_{eff}$) of optimized SiC lattice designs is found to be low (less than 1 W/m·K). This is significantly lower than that of traditional lifting gases, like helium, when used for a balloon operating on Venus.

Furthermore, the results developed here are far more consequential than for any one application. Advanced sandwich panels with truss-cores are likely to reach substantially higher performance for high temperature service by making use of similar design approaches. Deep-sea vehicles and structures can also utilize the same approaches the current disclosure used to achieve high strength, low-density structures that assist with thermal management. More broadly, the current disclosures shows that architected materials with well-designed hollow topologies can achieve higher ultimate strength than their non-hollow counterparts.

Supplemental Materials

To form asymmetric strut geometry with variable cross section in the Kelvin unit cells, this disclosure employs a set of seven design functions, as follows (the shapes of the functions can be found in FIG. 7):

$$f_1(x) = 1 \tag{A1}$$

$$f_2(x) = \frac{(x-0.5)^2}{0.5^2} \tag{A2}$$

$$f_3(x) = \frac{(x-0.5)^8}{0.5^8} \tag{A3}$$

$$f_4(x) = 1 - \exp\left(\frac{-(x-0.5)^4}{2(0.2)^4}\right) \tag{A4}$$

$$f_5(x) = \frac{1 - \exp\left(\frac{-(x-0.5)^4}{2(0.25)^4}\right)}{0.9996645374} \tag{A5}$$

$$f_6(x) = \frac{1 - \exp\left(\frac{-(x-0.5)^4}{2(0.3)^4}\right)}{0.9788903435} \tag{A6}$$

$$f_7(x) = \frac{1 - \exp\left(\frac{-(x-0.5)^4}{2(0.5)^4}\right)}{0.3934693403} \tag{A7}$$

$$\bar{A}(x) = \sum_{i=1}^{7} w_i \cdot f_i(x) \tag{A8}$$

$$\bar{R}(x) = \sum_{i=1}^{7} w_{i+7} \cdot f_i(x) \tag{A9}$$

FIG. 26 shows geometric details of the $\bar{\rho}=2.00\%$ optimized unit cell geometry with solid struts obtained by minimizing $$\frac{1}{FS}:$$

(a) profile of the revolved section used to generate the struts; (b) optimal normalized cross-sectional area $A^-$ along the length of the struts; (c) Kelvin unit cell with optimized geometry; and (d) Cross-sectional view highlighting a single strut and nodal geometry.

Mesh sensitivity of the model was investigated prior to conducting optimization. This process is essential due to the expansive geometric design domain and presence of large stress gradients near free surfaces. The top performing designs in every generation must have controlled sensitivity to the mesh size for the optimizer to perform as intended. To generate various meshes, two seeding parameters available in Abaqus are varied: Approximate global seed size, and maximum deviation factor for curvature control. Different combinations of these two parameters are considered for numerous geometries, at different ranges of relative densities, to find a proper combination of seeding parameters ensuring results with minimum sensitivity to the mesh size. FIG. 19 at (a)-(c) illustrate mesh convergence results for the minimum FS (considering failure by shear and tensile rupture) from three designs. In these figures, the color bar represents the percent difference between the minimum FS for a design meshed with any combination of the seeding parameters and minimum FS for a converged combination of seeding parameters. White isolines indicate the number of elements in the meshes. It can be seen that a large number of elements is required for convergence. A global seed size of 6, and maximum deviation factor of 0.015 are chosen as the mesh seeding parameters. In contrast to the fine meshes required for convergence of local fields in stress analysis, the buckling analysis (which includes eight unit cells) can use comparatively coarser meshes (some results are shown in FIG. 19 at d and f. FIG. 19 shows mesh convergence results for single unit cell under hydrostatic pressure for cases with arbitrary geometry and relative densities: (a) $\bar{\rho}=1.00\%$, (b) $\bar{\rho}=1.50\%$, and (c) $\bar{\rho}=2.00\%$. Mesh convergence results for eigenvalue analysis of a 2×2×2 tessellation with arbitrary geometry and relative densities: (d) $\bar{\rho}=1.00\%$, (e) $\bar{\rho}=1.50\%$, and (f) $\bar{\rho}=2.00\%$. Global seed size of 20, and maximum deviation factor of 1 are chosen as the seeding parameters in the models for buckling analysis.

Radiative Heat Transport

Equation A10 is used to calculate the thermal radiativity $K_{rad}$ of kelvin foams. See, Coquard et al. (2012). The equation assumes that the struts have a solid triangular cross section. In this equation, $\sigma$ represents the Stefan-Boltzmann constant, T represents the ambient temperature, $\rho$ and sp represent the reflectivity and specularity parameters, $\epsilon$ represents the porosity parameter, and $D_{cell}$ represents the cell size. As information regarding optical properties such as reflectivity and specularity parameters is not available, the reference suggests taking these values as 1 and 0, respectively, for ceramic foams. To use this equation, hollow BAMs are assumed to be solid by ignoring the internal cavity in the calculation of porosity.

$$k_{rad} = \frac{16\sigma T^3}{3 \cdot \frac{3.278}{D_{cell}}\sqrt{1-\varepsilon} \cdot [(1-\rho)+\rho \cdot (1+0.4444 \cdot (1-sp))]} \quad (A10)$$

Thermal Conductivity of Helium Between Concentric Spheres

Considering the effective thermal conductivity between concentric spheres, the empirical relation in Eq. A11 is applicable when using a lifting gas. See, Raithby and Hollands (1975); Schlunder (1983). In this equation, $k_{eff}$ is the effective thermal conductivity of the fluid with convection, ko is the thermal conductivity of the quiescent fluid, $P_r$ is the Prandtl number, $F_{sph}$ is a geometric factor for concentric spheres, and $Ra_L$ is the Rayleigh number.

$$\frac{k_{eff}}{k_a} = 0.75 \left(\frac{Pr}{0.861+Pr}\right)^{\frac{1}{4}} (F_{sph}Ra_L)^{\frac{1}{4}} \quad (A11)$$

The thermal conductivity of the Helium $k_o$ and the Prandtl number $P_r$ under Venus atmospheric temperature and pressure can be calculated using the Eqs. A12 and A13 respectively. See, Petersen (1970). In these equations, T and $P_e$ are the Venus atmospheric temperature and pressure in Celsius and bar respectively.

$$k_o = 0.1444 \times (1+2.7\times 10^{-4}\times P_e) \times \left(\frac{T+273.16}{273.16}\right)^{0.71\times(1-2\times 10^{-4}\times P_e)} \quad (A12)$$

$$Pr = \frac{0.6728}{1+2.7\times 10^{-4}\times P_e} \times \left(\frac{T+273.16}{273.16}\right)^{-(0.01-1.42\times 10^{-4}\times P_e)} \quad (A13)$$

Also, the Rayleigh number $Ra_L$ for helium and the geometric factor for concentric spheres $F_{sph}$ can be calculated using Eqs. A14 and A15, respectively. In these equations, $T_1$-$T_2$ represents the difference between the temperature of the outside and the inside of the spheres. $D_o$ and $D_i$ denote the diameters of the outer and inner spheres, respectively. g is the acceleration due to gravity on Venus, which is approximately 8.87 m/s². cp is the specific heat capacity at constant pressure, which for helium is about $$5190 \frac{J}{kg \cdot K} \cdot k_o, \rho,$$

and µ represents the thermal conductivity (Eq. A12), mass density (Eq. A16), and viscosity (Eq. A17) of helium, respectively.

$$Ra_L = \frac{g \cdot \beta \cdot (T_1-T_2) \cdot \left(\frac{D_o-D_i}{2}\right)^3}{\frac{\mu}{\rho} \cdot \frac{k_a}{\rho \cdot cp}} \quad (A14)$$

$$F_{sph} = \frac{\left(\frac{D_o-D_i}{2}\right)}{\left(\frac{D_o}{D_i}\right)^4 \cdot \left(D_i^{-\frac{7}{5}}+D_o^{-\frac{7}{5}}\right)^5} \quad (A15)$$

$$\rho = \frac{0.17623 \cdot P_e}{\left(\frac{T+273.16}{273.16}\right)} \cdot \left(1+\frac{0.53\times 10^{-3} \cdot P_e}{\left(\frac{T+273.16}{273.16}\right)^{1.2}}\right)^{-1} \quad (A16)$$

$$\mu = 1.865\times 10^{-5} \times \left(\frac{T+273.16}{273.16}\right)^{0.7} \quad (A17)$$

FIG. 31 shows Table A1, Optimized design variables (correspond to A⁻) and fillet radius. FIG. 32 shows Table A2, Optimized design variables (correspond to R⁻).

The current disclosure also provides cellular materials comprised of a 3D periodic network of beams with open-cell Kelvin foam (truncated octahedron) that have particular cross-sectional geometries that resist buckling while also suppressing failure of the base material when the cellular material is subjected to hydrostatic loading as shown and described herewith.

The current disclosure also provides methods for making cellular materials comprised of a 3D periodic network of beams with open-cell Kelvin foam (truncated octahedron) that have particular cross-sectional geometries that resist buckling while also suppressing failure of the base material when the cellular material is subjected to hydrostatic loading as shown and described herewith.

REFERENCES

All references are hereby incorporated by reference to the extent not inconsistent herewith. Provisional patent application number 63480337 is also incorporated herein by reference.

Andersen, M. N., Wang, F., Sigmund, O., 2021. On the competition for ultimately stiff and strong architected materials. Materials & Design 198, 109356.

Bansal, N. P., 2005. Handbook of ceramic composites. volume 165. Springer.

Barea, R., Osendi, M. I., Ferreira, J. M., Miranzo, P., 2005. Thermal conductivity of highly porous mullite material. Acta materialia 53, 3313-3318.

Bauer, J., Schroer, A., Schwaiger, R., Kraft, O., 2016. Approaching theoretical strength in glassy carbon nanolattices. Nature materials 15, 438-443.

Bavdekar, S., Subhash, G., 2018. Comparison of pressure-sensitive strength models for ceramics under ultrahigh confinement. International Journal of Impact Engineering 118, 60-66.

Brannon, R. M., Lee, M. Y., Bronowski, D. R., 2005. Uniaxial and triaxial compression tests of silicon carbide ceramics under quasi-static loading condition. Technical Report. Sandia National Laboratories.

Clarke, J. P., Rimoli, J., Gloyd, J. T., Logarzo, H., Kraus, J., 2018. Evacuated Airship for Mars Missions: NIAC Phase I, 2017. Technical Report.

Coquard, R., Rochais, D., Baillis, D., 2012. Conductive and radiative heat transfer in ceramic and metal foams at fire temperatures: Contribution to the special issue "materials in fire" guest editor k. ghazi wakili. Fire technology 48, 699-732.

Costa, G. C., Jacobson, N. S., Lukco, D., Hunter, G. W., Nakley, L., Radoman-Shaw, B. G., Harvey, R. P., 2017.

Chemical and microstructural changes in metallic and ceramic materials exposed to Venusian surface conditions.

Crook, C., Bauer, J., Guell Izard, A., Santos de Oliveira, C., Martins de Souza e Silva, J., Berger, J. B., Valdevit, L., 2020. Plate-nanolattices at the theoretical limit of stiffness and strength. Nature communications 11, 1579.

Cui, H., Hensleigh, R., Chen, H., Zheng, X., 2018. Additive manufacturing and size-dependent mechanical properties of three-dimensional microarchitected, high-temperature ceramic metamaterials. Journal of Materials Research 33, 360-371.

Derveni, F., Gross, A. J., Peterman, K. D., Gerasimidis, S., 2022. Postbuckling behavior and imperfection sensitivity of elastic-plastic periodic plate-lattice materials. Extreme Mechanics Letters 50, 101510.

Deshpande, V. S., Fleck, N. A., Ashby, M. F., 2001. Effective properties of the octet-truss lattice material. Journal of the Mechanics and Physics of Solids 49, 1747-1769.

Dong, L., Deshpande, V., Wadley, H., 2015. Mechanical response of ti-6al-4v octet-truss lattice structures. International Journal of Solids and Structures 60-61, 107-124. URL: sciencedirect.com/science/article/pii/S0020768315000669,//doi.org/10.1016/j.ijsolstr.2015.02.020.

Dyson, R., Bruder, G., 2010. Progress towards the development of a long-lived venus lander duplex system, in: 46th AIAA/ASME/SAE/ASEE Joint Propulsion Conference & Exhibit, p. 6917.

Emami, F., Gross, A. J., 2023. Mechanical properties of hierarchical beams for large-scale space structures, in: AIAA SCITECH 2023 Forum, p. 0384.

Gibson, L., Ashby, M., 1999. Cellular solids: Structure and properties, Cambridge univ.

Gibson, L. J., Ashby, M. F., Schajer, G., Robertson, C., 1982. The mechanics of two-dimensional cellular materials. Proceedings of the Royal Society of London. A. Mathematical and Physical Sciences 382, 25-42.

Gong, L., Kyriakides, S., 2005. Compressive response of open cell foams part ii: Initiation and evolution of crushing. International Journal of Solids and Structures 42, 1381-1399.

Grenestedt, J. L., Bassinet, F., 2000. Influence of cell wall thickness variations on elastic stiffness of closed-cell cellular solids. International Journal of Mechanical Sciences 42, 1327-1338.

Hansen, N., Akimoto, Y., Baudis, P., 2019. CMA-ES/pycma on Github. Zenodo, DOI:10.5281/zenodo.2559634. URL: doi.org/10. 5281/zenodo.2559634, doi:10.5281/zenodo.2559634. F.Emami, Andrew. J. Gross: Preprint submitted to Elsevier Page 19 of 26 Better Than Linear Scaling 0.010.00 0.030.02 0.050.04/L FIG. 16: Sensitivity analysis of the optimized models due to geometrical imperfections, correspond to the first buckling eigen mode.

Hansen, N., Müller, S. D., Koumoutsakos, P., 2003. Reducing the time complexity of the derandomized evolution strategy with covariance matrix adaptation (cma-es). Evolutionary computation 11, 1-18.

Headley, A. J., Hileman, M. B., Robbins, A. S., Piekos, E. S., Stirrup, E. K., Roberts, C. C., 2019. Thermal conductivity measurements and modeling of ceramic fiber insulation materials. International Journal of Heat and Mass Transfer 129, 1287-1294.

Heard, H., Cline, C., 1980. Mechanical behaviour of polycrystalline beo, al 2 o 3 and aln at high pressure. Journal of Materials Science 15, 1889-1897.

Huber, N., Viswanath, R., Mameka, N., Markmann, J., Weißmuller, J., 2014. Scaling laws of nanoporous metals under uniaxial compression. Acta materialia 67, 252-265.

Jenett, B., Gregg, C., Cheung, K., 2019. Discrete lattice material vacuum airship, in: AIAA Scitech 2019 Forum, p. 0815.

Keppeler, M., Reichert, H. G., Broadley, J., Thurn, G., Wiedmann, I., Aldinger, F., 1998. High temperature mechanical behaviour of liquid phase sintered silicon carbide. Journal of the European Ceramic Society 18, 521-526.

Kumar, P., Topin, F., 2014. Simultaneous determination of intrinsic solid phase conductivity and effective thermal conductivity of kelvin like foams. Applied thermal engineering 71, 536-547.

Lakes, R., 1993. Materials with structural hierarchy. Nature 361, 511-515. URL: doi.org/10.1038/361511a0, doi:10.1038/361511a0.

Landis, G. A., Oleson, S. R., Grantier, D., 2014. Zephyr: A landsailing rover for venus, in: International Astronautical Congress.

Lebonnois, S., Schubert, G., 2017. The deep atmosphere of venus and the possible role of density-driven separation of co2 and n2. Nature Geoscience 10, 473-477.

Li, Y., Xia, X. L., Sun, C., Zhang, S. D., Tan, H. P., 2019. Volumetric radiative properties of irregular open-cell foams made from semitransparent absorbing-scattering media. Journal of Quantitative Spectroscopy and Radiative Transfer 224, 325-342.

Lukco, D., Spry, D. J., Neudeck, P. G., Nakley, L. M., Phillips, K. G., Okojie, R. S., Hunter, G. W., 2020. Experimental study of structural materials for prolonged venus surface exploration missions. Journal of Spacecraft and Rockets 57, 1118-1128.

Magnani, G., Minoccari, G., Pilotti, L., 2000. Flexural strength and toughness of liquid phase sintered silicon carbide. Ceramics International 26, 495-500.

Meza, L. R., Das, S., Greer, J. R., 2014. Strong, lightweight, and recoverable three-dimensional ceramic nanolattices. Science 345, 1322-1326.

Meza, L. R., Phlipot, G. P., Portela, C. M., Maggi, A., Montemayor, L. C., Comella, A., Kochmann, D. M., Greer, J. R., 2017. Reexamining the mechanical property space of three-dimensional lattice architectures. Acta Materialia 140, 424-432.

Meza, L. R., Zelhofer, A. J., Clarke, N., Mateos, A. J., Kochmann, D. M., Greer, J. R., 2015. Resilient 3d hierarchical architected metamaterials. Proceedings of the National Academy of Sciences 112, 11502-11507.

Moore, R. C., Siegel, N. P., Kolb, G. J., Vernon, M. E., Ho, C. K., 2010. Design considerations for concentrating solar power tower systems employing molten salt. Technical Report. Sandia National Laboratories (SNL), Albuquerque, N M, and Livermore, CA . . . .

Munro, R., 1997. Material properties of a sintered α-sic. Journal of physical and chemical reference data 26, 1195-1203.

Oleson, S. R., 2018. Concurrent Multidisciplinary Preliminary Assessment of Space Systems (COMPASS) Final Report: Advanced Long-Life Lander Investigating the Venus Environment (ALIVE). Technical Report.

Ortona, A., D'Angelo, C., Gianella, S., Gaia, D., 2012. Cellular ceramics produced by rapid prototyping and replication. Materials Letters 80, 95-98.

Petersen, H., 1970. The properties of helium: density, specific heats, viscosity, and thermal conductivity at pressures from 1 to 100 bar and from room temperature to about 1800 K. Jul. Gjellerup Copenhagen.

Pingle, S., Fleck, N., Deshpande, V., Wadley, H., 2011. Collapse mechanism maps for a hollow pyramidal lattice. Proceedings of the Royal Society A: Mathematical, Physical and Engineering Sciences 467, 985-1011.

Portela, C. M., Greer, J. R., Kochmann, D. M., 2018. Impact of node geometry on the effective stiffness of non-slender three-dimensional truss lattice architectures. Extreme Mechanics Letters 22, 138-148.

Queheillalt, D. T., Wadley, H. N., 2005. Cellular metal lattices with hollow trusses. Acta Materialia 53, 303-313.

Raithby, G., Hollands, K., 1975. A general method of obtaining approximate solutions to laminar and turbulent free convection problems, in: Advances in heat transfer. Elsevier. volume 11, pp. 265-315.

Reinelt, D. A., Kraynik, A. M., 1993. Large elastic deformations of three-dimensional foams and highly concentrated emulsions. Journal of colloid and interface science 159, 460-470.

Sanchez-Gonzilez, E., Miranda, P., Guiberteau, F., Pajares, A., 2011. Effect of microstructure on the mechanical properties of liquid-phase-sintered silicon carbide at pre-creep temperatures. Journal of the European Ceramic Society 31, 1131-1139.

Sans, M., Schick, V., Parent, G., Farges, O., 2020. Experimental characterization of the coupled conductive and radiative heat transfer in ceramic foams with a flash method at high temperature. International Journal of Heat and Mass Transfer 148, 119077.

Schlunder, E. U., 1983. Heat exchanger design handbook.

Shackelford, J., Alexander, W., 2001. Material science and engineering handbook third version. Boca, Raton: CRC Press LLC 103, 850.

Thomson, W., 1887. Lxiii. on the division of space with minimum partitional area. The London, Edinburgh, and Dublin Philosophical Magazine and Journal of Science 24, 503-514.

Timoshenko, S. P., Gere, J. M., 2009. Theory of elastic stability. Courier Corporation.

Torrents, A., Schaedler, T., Jacobsen, A., Carter, W., Valdevit, L., 2012. Characterization of nickel-based microlattice materials with structural hierarchy from the nanometer to the millimeter scale. Acta Materialia 60, 3511-3523.

Tu, T., Jiang, G., 2018. Sic reticulated porous ceramics by 3d printing, gelcasting and liquid drying. Ceramics International 44, 3400-3405.

Wei, G., Liu, Y., Zhang, X., Yu, F., Du, X., 2011. Thermal conductivities study on silica aerogel and its composite insulation materials. International Journal of Heat and Mass Transfer 54, 2355-2366.

Zhang, J., Jiang, D., Lin, Q., Chen, Z., Huang, Z., 2013. Gelcasting and pressureless sintering of silicon carbide ceramics using $Al_2O_3$-$Y_2O_3$ as the sintering additives. Journal of the European Ceramic Society 33, 1695-1699.

Zhang, X., Vyatskikh, A., Gao, H., Greer, J. R., Li, X., 2019. Lightweight, flaw-tolerant, and ultrastrong nano-architected carbon. Proceedings of the National Academy of Sciences 116, 6665-6672.

Zheng, X., Smith, W., Jackson, J., Moran, B., Cui, H., Chen, D., Ye, J., Fang, N., Rodriguez, N., Weisgraber, T., et al., 2016. Multiscale metallic metamaterials. Nature materials 15, 1100-1106.

Zhu, D., 2018. Aerospace ceramic materials: thermal, environmental barrier coatings and SiC/SiC ceramic matrix composites for turbine engine applications. Technical Report.

Zhu, D., Miller, R. A., 2004. Development of advanced low conductivity thermal barrier coatings. International Journal of Applied Ceramic Technology 1, 86-94.

Zhu, H., Knott, J., Mills, N., 1997. Analysis of the elastic properties of open-cell foams with tetrakaidecahedral cells. Journal of the Mechanics and Physics of Solids 45, 319-343.

Various modifications and variations of the described methods, compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A vehicle able to function in extremely high temperature, extremely corrosive chemical composition environment, and extremely high atmospheric pressure comprising:
    an exterior and an interior;
    at least one ceramic truss strut and at least one ceramic node in the interior of the vehicle forming at least one ceramic truss-lattice;
    at least one first chamber in the interior of the vehicle configured to contain a vacuum;
    at least one lifting gas contained within the interior of the vehicle outside the at least one first chamber containing the vacuum;
    at least one central cold bay chamber in substantially a center of the interior of the vehicle with the at least one ceramic truss-lattice located outside a central cold bay exterior of the at least one central cold bay chamber; and
    at least one emissivity coating applied on the exterior of the vehicle.

2. The vehicle of claim 1, wherein the vehicle is a vacuum airship.

3. The vehicle of claim 1, comprising a second chamber located within and adjacent to the exterior of the vehicle configured to substantially fill with an atmospheric gas, wherein the atmospheric gas performs as ballast for the vehicle.

4. The vehicle of claim 1, wherein the at least one ceramic truss-lattice remains mechanically stable when deployed in environmental conditions comprising substantially: atmospheric density $\rho=65$ kg/m$^3$, atmospheric pressure $p=9.2$ MPa, and surface temperature $T=464°$ C.

5. The vehicle of claim 1, wherein the at least one ceramic truss-lattice comprises a silicon carbide (SiC) Kelvin foam.

6. The vehicle of claim 5, wherein the SiC Kelvin foam comprises at least one tetrakaidecahedron cell.

7. The vehicle of claim 1, further comprising at least one fluid filled chamber in the interior of the vehicle.

8. The vehicle of claim 1, further comprising at least one instrument contained within the at least one central cold bay chamber.

9. The vehicle of claim 1, wherein the at least one ceramic truss-lattice is asymmetric.

10. The vehicle of claim 1, wherein the at least one ceramic truss-lattice has a strength scaling relationship shown by $$\overline{\sigma}_f^{BAM}(GPa) = 0.134 \cdot 1.82 \cdot \rho^{-0.62}$$

wherein p is relative density; and wherein $\overline{\sigma}_f^{BAM}$ is pressure sensitive strength.

11. The vehicle of claim 1, wherein the vehicle is configured to have a relative density of substantially p=0.65% and generates substantially 44 kg of lift for every cubic meter of atmosphere that the vehicle displaces.

12. The vehicle of claim 1, wherein the vehicle is configured to collocate shear stress concentrations in at least one nodal region undergoing extreme pressure stress.

13. The vehicle of claim 1, wherein the at least one ceramic truss strut is hollow with a relative density of substantially p=1.5% or p=2%.

14. The vehicle of claim 1, wherein the at least one emissivity coating comprises gold (Au).

15. The vehicle of claim 1, wherein a thermal conductivity of the vehicle is approximated by $$K_{cond} = \frac{\overline{p}}{3} \cdot K$$

wherein K is a thermal conductivity of a parent material forming the at least one ceramic truss strut and the at least one ceramic node;

$K_{cond}$ is the thermal conductivity; and p is relative density.

16. The vehicle of claim 1, wherein the lifting gas is Helium (He).

* * * * *